US011428532B2

(12) United States Patent
Toutov et al.

(10) Patent No.: US 11,428,532 B2
(45) Date of Patent: Aug. 30, 2022

(54) GENERATING A GEOMAGNETIC MAP

(71) Applicant: Astra Navigation, Inc., Escondido, CA (US)

(72) Inventors: Alexandre Toutov, Inverary (CA); Maryna Mukhina, Kyiv (UA); Svitlana Ilnytska, Kyiv (UA)

(73) Assignee: Astra Navigation, Inc., Escondido, CA (US)

( * ) Notice: Subject to any disclaimer, the term of this patent is extended or adjusted under 35 U.S.C. 154(b) by 0 days.

(21) Appl. No.: 17/494,431

(22) Filed: Oct. 5, 2021

(65) Prior Publication Data

US 2022/0026217 A1 Jan. 27, 2022

Related U.S. Application Data

(63) Continuation of application No. 17/348,561, filed on Jun. 15, 2021.

(Continued)

(51) Int. Cl.
*G01C 21/06* (2006.01)
*G01C 21/00* (2006.01)
(Continued)

(52) U.S. Cl.
CPC ....... *G01C 21/1654* (2020.08); *G01C 21/005* (2013.01); *G01C 21/08* (2013.01);
(Continued)

(58) Field of Classification Search
CPC ............................ G01R 33/10; G01R 33/0023; G01R 33/0286; G01R 33/0206; G01R 33/0035;
(Continued)

(56) References Cited

U.S. PATENT DOCUMENTS

2009/0088974 A1 4/2009 Yasan
2009/0150457 A1* 6/2009 Nakamura ............. G09B 29/10
707/999.203
(Continued)

FOREIGN PATENT DOCUMENTS

CN 101867868 A 10/2010
JP 2003215259 A 7/2003
(Continued)

OTHER PUBLICATIONS

International Search Report and Written Opinion for Application No. PCT/US2021/037644, dated Sep. 27, 2021, 9 pages.
(Continued)

*Primary Examiner* — Nga X Nguyen
(74) *Attorney, Agent, or Firm* — Baker Botts L.L.P.

(57) ABSTRACT

In one embodiment, a method includes at a mapping server receiving from a plurality of regional servers a plurality of regional magnetic data sets; at the mapping server updating a geomagnetic map with one or more of the regional magnetic data sets, wherein the geomagnetic map comprises one or more of the geographic regions; and from the mapping server communicating one or more portions of the geomagnetic map as updated to one or more of the regional servers for distribution as geomagnetic map information to one or more of the magnetic navigation devices for localization or navigation.

52 Claims, 27 Drawing Sheets

Related U.S. Application Data

(60) Provisional application No. 63/210,411, filed on Jun. 14, 2021, provisional application No. 63/040,352, filed on Jun. 17, 2020.

(51) Int. Cl.
  *G01C 21/16* (2006.01)
  *G01C 21/08* (2006.01)
  *G01S 19/49* (2010.01)

(52) U.S. Cl.
  CPC ....... *G01C 21/165* (2013.01); *G01C 21/3807* (2020.08); *G01C 21/3859* (2020.08); *G01C 21/3874* (2020.08); *G01S 19/49* (2013.01)

(58) Field of Classification Search
  CPC ............ H04M 1/0202; H04M 2250/12; G01C 21/1654; G01C 21/005; G01C 21/08; G01C 21/165; G01C 21/3807; G01C 21/3859; G01C 21/3874; G01S 19/49
  See application file for complete search history.

(56) References Cited

U.S. PATENT DOCUMENTS

| | | | | |
|---|---|---|---|---|
| 2013/0279543 | A1* | 10/2013 | Torimoto | H04W 4/024 375/146 |
| 2014/0129136 | A1 | 5/2014 | Celia | |
| 2015/0198722 | A1 | 7/2015 | Ben-Akiva | |
| 2016/0116290 | A1 | 4/2016 | Haverinen | |
| 2016/0202064 | A1 | 7/2016 | Haverinen | |
| 2017/0089706 | A1 | 3/2017 | Ribeiro | |
| 2017/0102467 | A1 | 4/2017 | Nielsen | |
| 2017/0299724 | A1 | 10/2017 | Hsu | |
| 2018/0283048 | A1 | 10/2018 | Hage | |
| 2019/0128673 | A1 | 5/2019 | Faragher | |
| 2019/0223138 | A1 | 7/2019 | Ronen | |
| 2020/0103477 | A1* | 4/2020 | Berkovich | G01R 33/0035 |
| 2020/0264316 | A1 | 8/2020 | Langstraat | |
| 2020/0293508 | A1* | 9/2020 | Tan | G06F 16/909 |

FOREIGN PATENT DOCUMENTS

| | | |
|---|---|---|
| KR | 20150040513 A | 4/2015 |
| KR | 20180072914 A | 7/2018 |
| WO | WO-2021067140 A1 * | 4/2021 |

OTHER PUBLICATIONS

Angelis, et al., An Experimental System for Tightly Coupled Integration of GPS and AC Magnetic Positioning, IEEE Transactions on Instrumentation and Measurement, vol. 65, No. 5, pp. 1232-1241, May 2016.

Ashraf, et al., Floor Identification Using Magnetic Field Data with Smartphone Sensors, www.mdpi.com/journal/sensors, Jun. 3, 2019.

Canciani, et al., Absolute Positioning Using the Earth's Magnetic Anomaly Field, Air Force Institute of Technology, Sep. 2016.

Canciani, et al., Magnetic Navigation, Air Force Institute of Technology.

Chen, et al., Quantum Physicists Found a New, Safer Way to Navigate, https://www.wired.com/story/quantum-physicists-found-a-new-safer-way-to-navigate/, Nov. 1, 2018.

Hernandez, et al., Steering Control of Automated Vehicles Using Absolute Positioning GPS and Magnetic Markers, IEEE Transactions on Vehicular Technology, vol. 52, No. 1, pp. 150-161, Jan. 2003.

Indooratlas, et al., Last meter accuracy through technology fusion, https://www.indooratlas.com/positioning-technology/, 2021.

Kim, et al., Indoor positioning system using geomagnetic anomalies for smartphones, International Conference on Indoor Positioning and Indoor Navigation, Nov. 2012.

Kim, et al., Indoor Positioning System Using Magnetic Field Map Navigation and an Encoder System, www.mdpi.com/journal/sensors, Mar. 22, 2017.

Lee, et al., Aerial Simultaneous Localization and Mapping Using Earth's Magnetic Anomaly Field, Air Force Institute of Technology, Mar. 21, 2019.

Li, et al., How feasible is the use of magnetic field alone for indoor positioning, International Conference on Indoor Positioning and Indoor Navigation, Nov. 2012.

Liu, et al., Fusion of Magnetic and Visual Sensors for Indoor Localization: Infrastructure-Free and More Effective, IEEE Transactions on Multimedia, vol. 19, No. 4, pp. 874-888, Apr. 2017.

Lohmann, et al., Magnetic maps in animals: nature's GPS, The Journal of Experimental Biology 210, pp. 3697-3705, Jul. 2007.

Noaa, et al., The World Magnetic Model—Uses, https://www.ngdc.noaa.gov/geomag/WMM/uses.shtml, Feb. 2020.

Prigge, et al., Signal Architecture for a Distributed Magnetic Local Positioning System, IEEE Sensors Journal, vol. 4, No. 6, pp. 864-873, Dec. 2004.

Riehle, et al., Indoor Waypoint Navigation via Magnetic Anomalies, IEEE Engineering in Medicine and Biology Society. Conference Aug. 2011.

Shockley, et al., Ground Vehicle Navigation Using Magnetic Field Variation, Air Force Institute of Technology, Sep. 2012.

Solin, et al., Modeling and Interpolation of the Ambient Magnetic Field by Gaussian Processes, Accepted to IEEE Transactions on Robotics, Mar. 21, 2018.

Vallivaara et al., Simultaneous Localization and Mapping Using the Indoor Magnetic Field, University of Oulu Graduate School; University of Oulu, Faculty of Information Technology and Electrical Engineering Acta Univ. Oul. C 642, 2018.

* cited by examiner

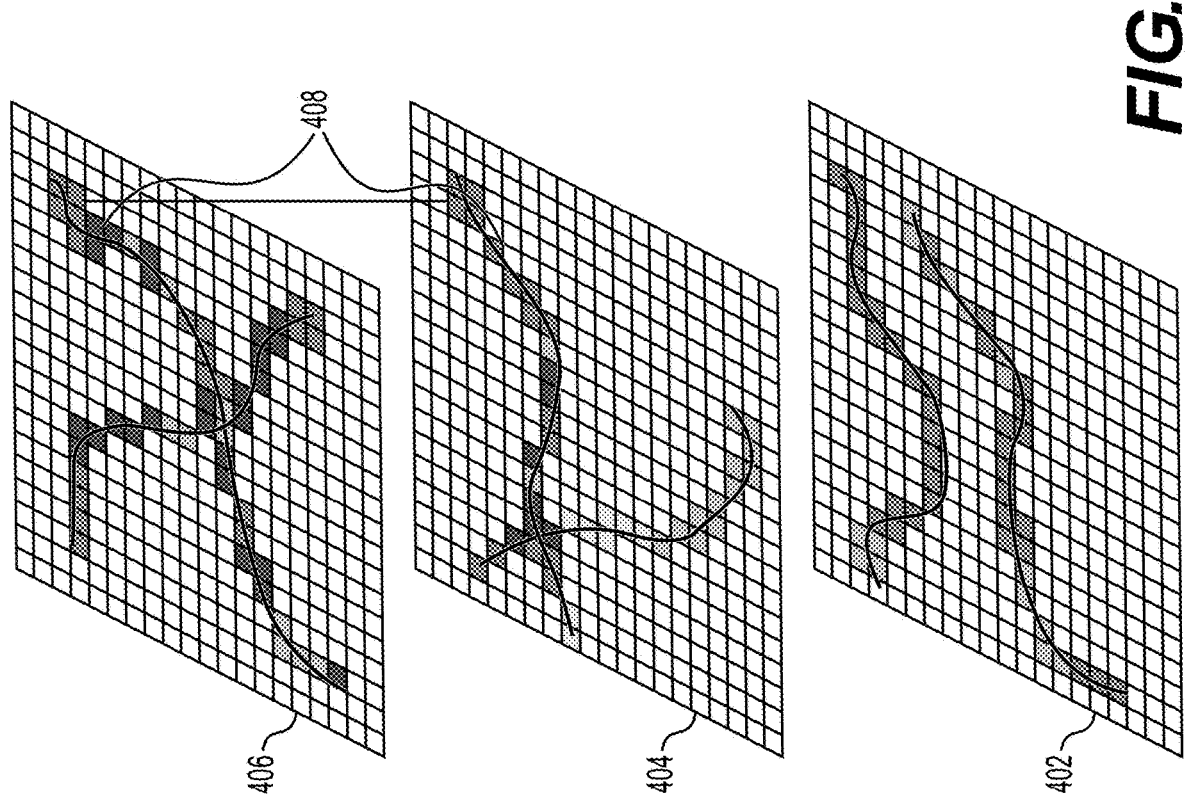

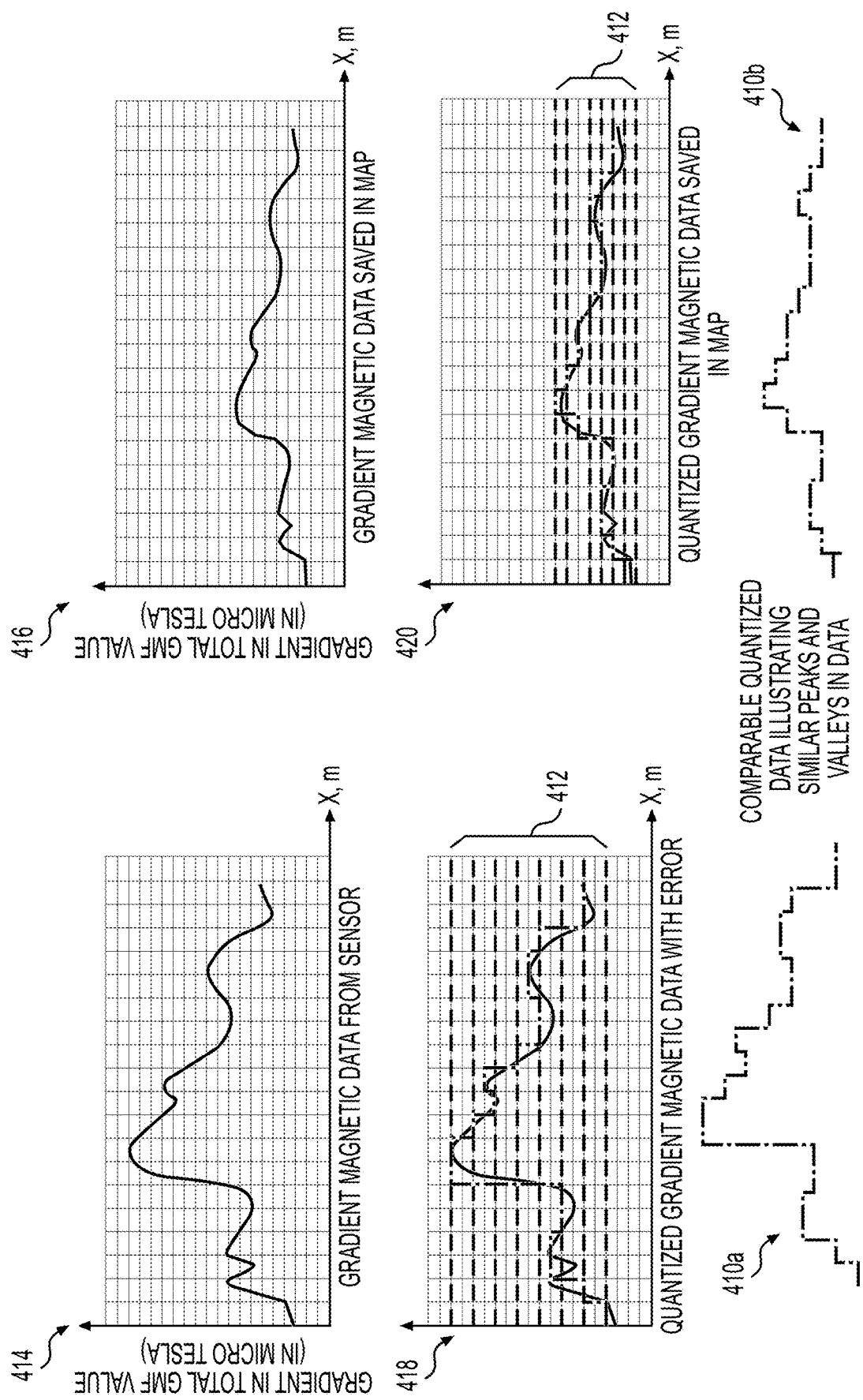

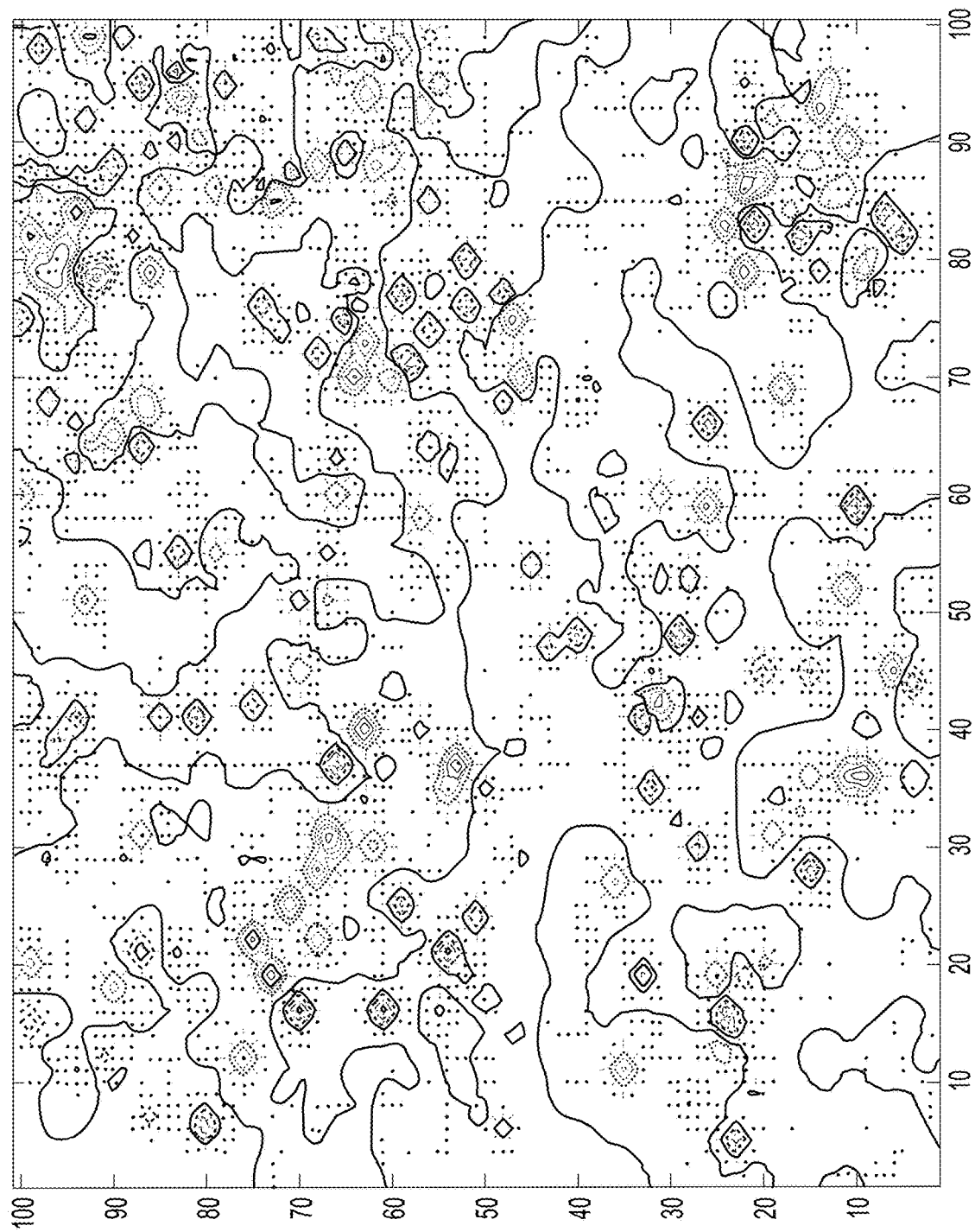

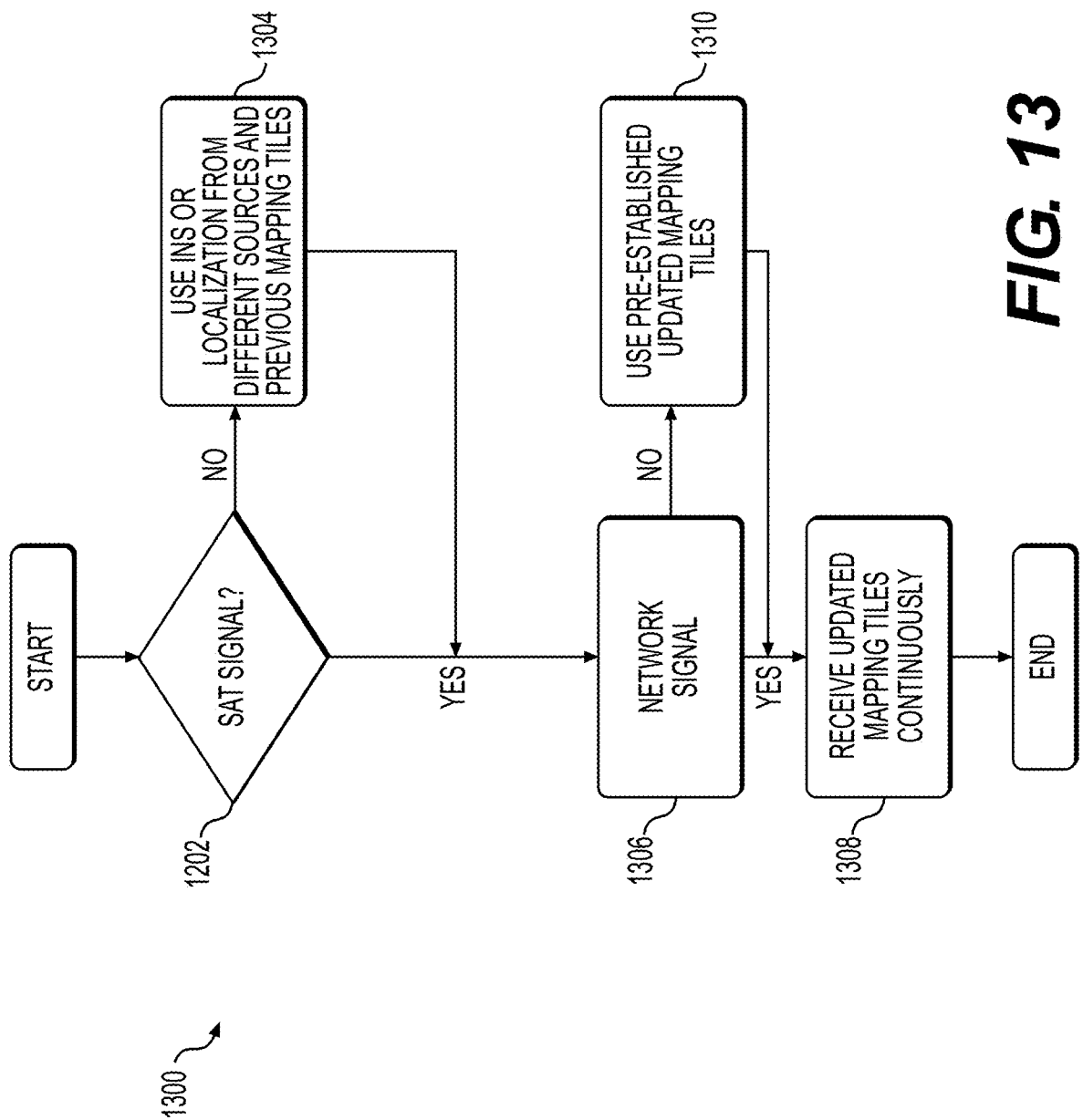

TRAJECTORY OF MOTION IN HORIZONTAL PLANE
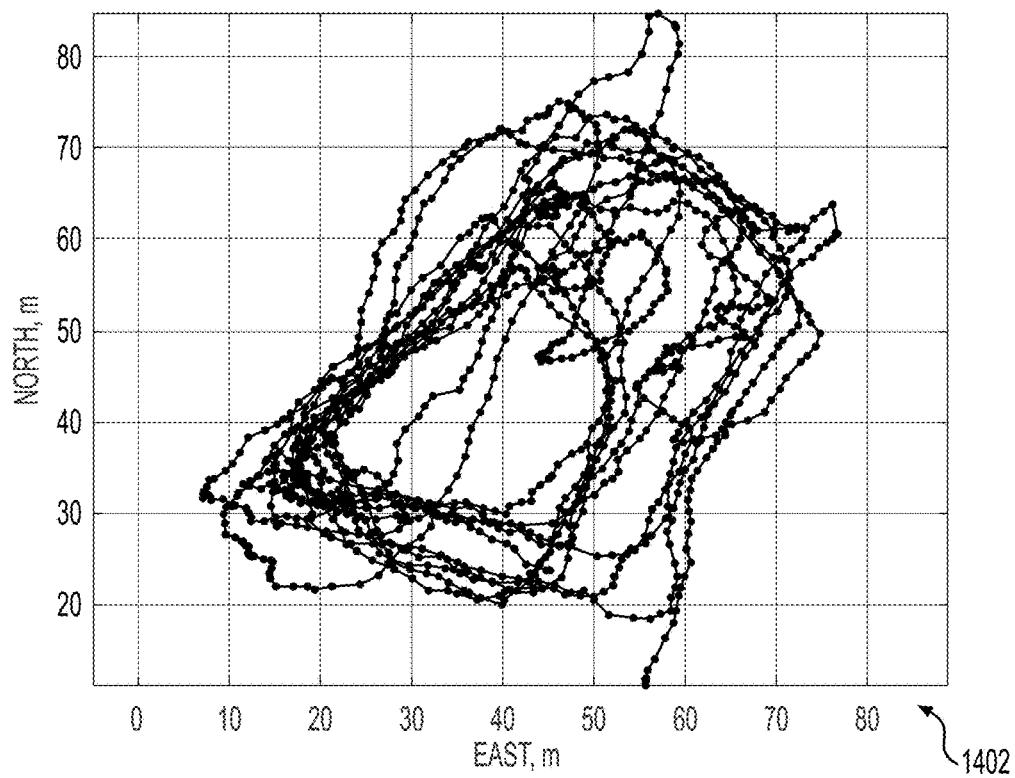
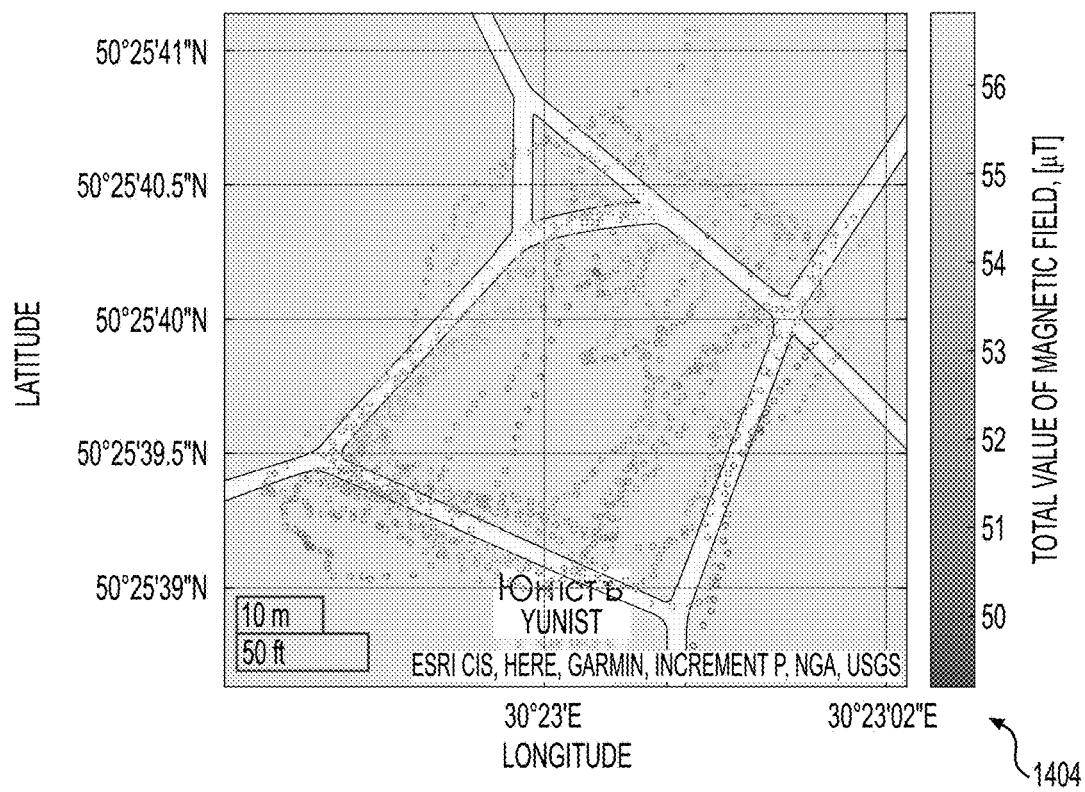
FIG. 14A

GENERATING A GEOMAGNETIC MAP

PRIORITY

This application is a continuation under 35 U.S.C. § 120 of U.S. patent application Ser. No. 17/348,561, filed 15 Jun. 2021, which claims the benefit, under 35 U.S.C. § 119(e), of U.S. Provisional Patent Application No. 63/040,352, filed 17 Jun. 2020, which is incorporated herein by reference, and of U.S. Provisional Patent Application No. 63/210,411, filed 14 Jun. 2021, which is also incorporated herein by reference.

TECHNICAL FIELD

This disclosure generally relates to magnetic mapping and navigation.

BACKGROUND

Navigation systems come in a variety of different architectures for use in different applications, including personal, commercial, and military. Many such systems operate on the premise of a Global Navigation Satellite System (GNSS). GNSS is a general term used to describe a network of satellites that can be used to produce position, navigation, and time (PNT) data sets. The Global Positioning System (GPS) is a widely used form of GNSS. Regional applications of such systems are also used to generate more regionally specific PNT data. For example, Galileo can be used in Europe; GLONASS can be used in Russia; and the BeiDou Navigation Satellite System (BDS) can be used in China.

GNSSs can have failure points. For example, some GNSSs lose reliability when operated inside buildings or in areas where network communication to the device is intermittent. Some GNSSs lose reliability when operated in dense city environments where large buildings interfere with communication signals. Some GNSSs lose reliability when operated in areas such as caves, tunnels, and mountains that impede location devices' reception of signals from GNSS satellites. Moreover, some GNSSs are susceptible to malicious attacks by electronic interference or physical intervention that degrade their reliability.

BRIEF DESCRIPTION OF THE DRAWINGS

FIG. 4A is an example time overlay of various example magnetic profiles in an example region.

FIGS. 4B and 4C illustrate an example comparison between example quantized trajectory data for example sensor and mapping data.

FIGS. 4D-4I illustrate example trajectory data compared for similarities for improved functionality.

FIG. 13 illustrates an example method for navigating based on available localization and network connectivity.

FIGS. 14A-14D illustrate example magnetic data for improved indoor localization.

DESCRIPTION OF EXAMPLE EMBODIMENTS

Figure 1A:
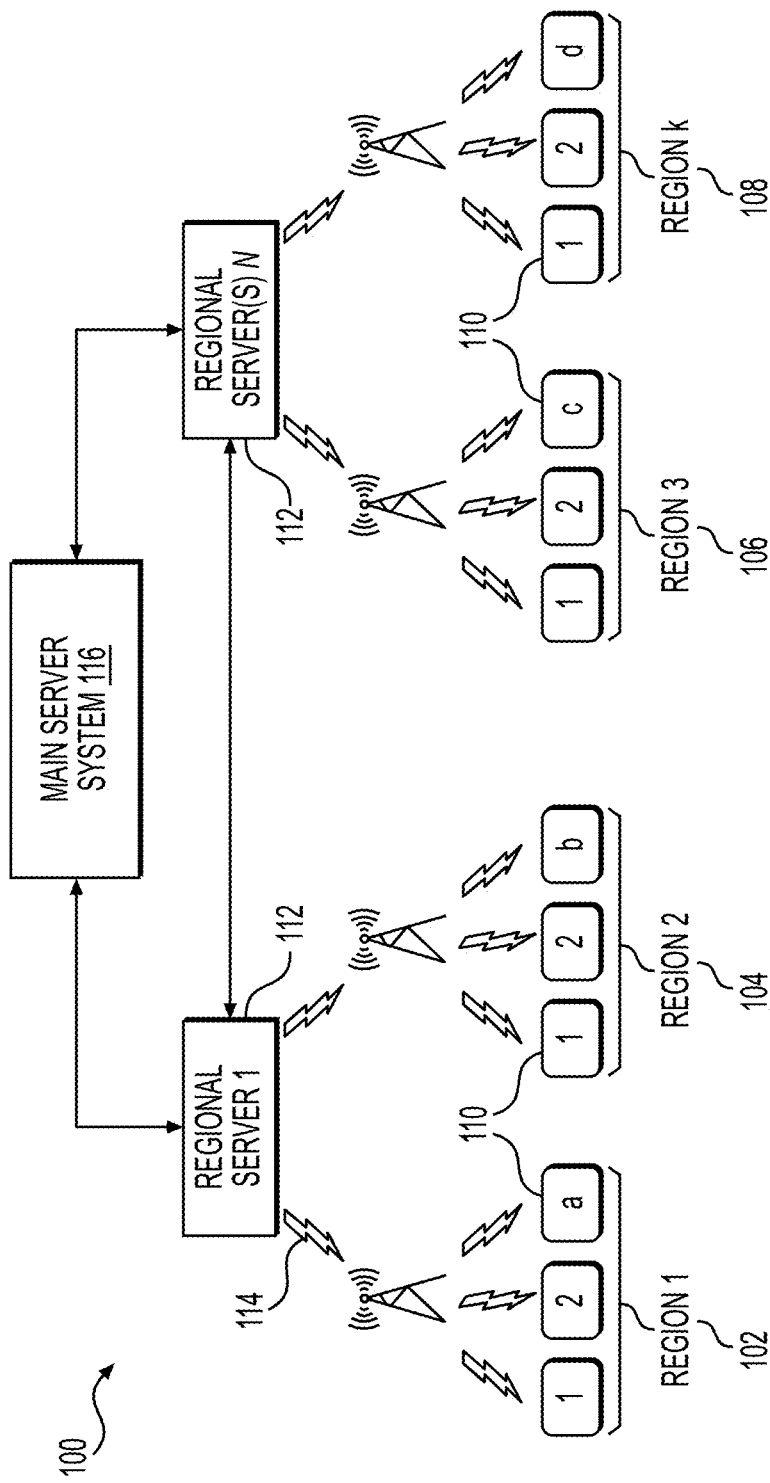
FIG. 1A illustrates an example magnetic navigation system.

In particular embodiments, magnetic measurements are used to perform localization or navigation based upon geomagnetic map information. In particular embodiments, localization or mapping is performed solely based upon magnetic measurements. In particular embodiments, localization or mapping is performed based upon a combination of magnetic measurements and additional localization information including (but not limited to) GNSS data or measurements made by inertial measurement units. In particular embodiments, magnetic measurements made by magnetic navigation devices are utilized to create and continuously update geomagnetic map information. In this way, accurate geomagnetic maps that are updated in response to changes in an environment can be made available within the magnetic navigation system.

GNSSs can be effective at providing navigational data, including maps and directions for navigation, in a variety of applications. However, GNSSs are not without their faults and are susceptible to reliability issues when there are interferences in the signals used to perform localization, e.g., local anomalies such as buildings or other geographical topography. Furthermore, GNSS based navigation systems can be susceptible to attacks from malicious actors that can result in complete loss of function or lead to spurious localization results.

When reliability of a GNSS is an issue, navigational data are often obtained by a secondary set of instruments such as Inertial Navigation Systems (INS). INS uses a combination of mechanical or electromechanical systems to calculate the position, orientation, and velocity of a moving object. For example, some systems may use computer systems, motion sensors, and rotational sensors to calculate, by dead reckoning, the position, orientation and velocity of a navigation device. This can be done without the use of external references such as a GNSS. However, inertial systems accumulate navigational errors that can lead to incorrect data if not periodically corrected using accurate position data.

The Earth's geomagnetic field (GMF) can be utilized to determine location. The Earth's GMF is locally unique and can depend on a number of factors including magnetic anomalies, artificial electromagnetic fields, or seasonal or diurnal variations. An impediment to the use of local GMF information to perform localization or navigation has been the general lack of availability of high resolution GMF maps. In fact, the current existing maps, based on GMF, are typically only capable of providing what is known as a 2-arc minute resolution. This equates to measurements with an approximately 3.6 km resolution, which can be difficult to use for precise localization and navigation purposes, especially in short ranges such as urban environments. Accordingly, magnetic navigation systems in particular embodiments can utilize measurements obtained via variety of different magnetic navigation devices to construct geomagnetic maps with sufficient resolution to provide localization with sufficient accuracy to enhance the localization or navigation that can be performed using GNSS alone and GNSS in combination with other sensing modalities including (but not limited to) inertial measurement unit.

Turning now to the drawings, navigation systems and methods that utilize magnetic map data in combination with GNSS data to perform localization or navigation in particular embodiments are illustrated. In particular embodiments, the use of magnetic measurements to obtain localization information from magnetic maps in combination with localization information from a GNSS can increase the reliability of a navigation system or provide additional functionality including (but not limited to) reliable indoor navigation or reliable navigation in environments where the navigation device is likely to be at least partially occluded from GNSS satellites (e.g. dense urban environments). In particular embodiments, the navigation system utilizes a main mapping server that is designed to maintain a current geomagnetic map of at least a portion of the earth where the geomagnetic map can include information from the current Geo Magnetic Field (GMF) as well as updated information obtained from magnetic navigation devices. In particular embodiments, the navigation system can also incorporate regional data servers (also interchangeably herein referred to as regional magnetic data services, regional mapping servers, regional navigational servers, regional servers) that communicate with the main mapping server and provide magnetic mapping data collected based upon measurements made by magnetic navigation devices. In particular embodiments, the magnetic mapping data that are provided by the regional mapping servers can be in the form of a patch data set. The specific data that are forwarded are largely dependent upon the magnetic measurement capabilities of the magnetic navigation devices, the processing performed by the regional servers, or the requirements of specific navigation applications. In certain embodiments, the main navigation or mapping server can utilize data received from regional navigation servers to create magnetic maps (consisting of various layers of magnetic and other data), update existing geomagnetic maps and refine the geomagnetic maps based on the received data (e.g. magnetic navigation device measurement data or data derived from magnetic navigation device measurement data including (but not limited to) a geomagnetic map patch data set). In particular embodiments, the regional servers receive data from individual magnetic navigation devices located within a specific region.

In particular embodiments, the data sets from the devices can carry a variety of information including (but not limited to) information within the region and local magnetic anomaly data. The regional data servers can process the data received from magnetic navigation devices to continuously update and refine local geomagnetic map data or geomagnetic map patch data sets. In particular embodiments, the regional servers can apply a weighting to each data set received from a magnetic navigation device based on factors including (but not limited to) the reliability and accuracy of the hardware used and localization (GNSS) data reported by the magnetic navigation device. In particular embodiments, regional data servers can generate updated geomagnetic map patch data sets (or patch data sets) based on data received from magnetic navigation devices over a period of time. In certain embodiments, the updated patch data sets can be generated based upon comparison with similar probabilistic data thus providing an improved and refined data set to update global geomagnetic map data utilized by the magnetic navigation system. The specific manner in which the geomagnetic maps or the servers that determine the manner in which the geomagnetic maps should be updated are largely dependent upon the requirements of specific navigation applications.

In particular embodiments, the navigation systems can continuously generate updated geomagnetic mapping data for use by magnetic navigation devices to perform localization or navigation. Such systems can provide reliable geomagnetic mapping data based on relatively stable GMF as well as improved resolution of data based on magnetic measurements obtained by individual navigation devices. In this way, navigation systems in particular embodiments can provide reliable geomagnetic map information and can utilize this information to provide more reliable localization and mapping services when compared to traditional navigation systems that rely upon GNSS alone. Furthermore, the geomagnetic maps can be regularly updated with increasingly accurate information as increasing numbers of magnetic navigation devices obtain field measurements and transmit new information to the system's servers.

Magnetic navigation systems, methods of performing localization or navigation based upon magnetic measurements using geomagnetic maps, and magnetic navigation devices in particular embodiments are discussed further below. FIG. 1A illustrates an example magnetic navigation system in which magnetic navigation devices utilize geomagnetic map information to perform localization or navigation, where the geomagnetic map information is updated based upon magnetic measurement made by the magnetic navigation devices. In particular embodiments, a magnetic navigation system 100 can provide location or navigation services within one or more geographic regions (102-108). At any given time, a variety of magnetic navigation devices (110) may be present within each of the regions (102-108). Examples of magnetic navigation devices 110 can include (but are not limited to) mobile phones, vehicle navigation systems, UAV navigation systems, or any other devices capable of receiving geomagnetic map information, capturing magnetic measurements or transmitting information based upon the magnetic measurements. The characteristics of magnetic navigation devices are only limited by the requirements of specific applications.

Many magnetic navigation devices are capable of communicating with various servers including (but not limited to) servers within the magnetic navigation system via a cellular data or satellite data communication network. While much of the discussion that follows references magnetic navigation devices that have network connectivity and retrieve data from remote servers, magnetic navigation devices in particular embodiments store the geomagnetic map information or additional map information required to render UIs in memory on the magnetic navigation device and are able perform localization or navigation in the absence of network connectivity. Where network connectivity is available, magnetic navigation devices in particular embodiments can receive data including (but not limited to) geomagnetic map information, UI map information (e.g. map tiles that can be displayed within a location or mapping UI), or navigation information (e.g. route information, or turn by turn directions) via the network connection. In particular embodiments, a single server system provides geomagnetic map information in combination with other map information. For example, geomagnetic map information can be provided as a layer of map information that includes (but is not limited to) visual map information that can be displayed within a UI. In particular embodiments, geomagnetic map information is obtained from different servers to the servers that provide UI map information or navigation information. In particular embodiments, magnetic navigation devices access map or navigation information via a unified interface and specific pieces of information are retrieved from a variety of servers or database systems within the magnetic navigation system and provided to the magnetic navigation device via the unified interface. Specific server architectures that can be utilized in magnetic navigation system in particular embodiments are discussed further below with reference to the regional server systems 112 and main server system 116 shown in FIG. 1A. Many other server architectures can be utilized within magnetic navigation systems as appropriate to the requirements of specific applications in particular embodiments.

In particular embodiments, the magnetic navigation system incorporates one or more regional server systems 112 that can communicate with magnetic navigation devices that communicate via a specific network or within a specific geographic region. The regional server systems can transmit geomagnetic map data 114 to magnetic navigation devices 110 within a geographic region (102-108) and receive magnetic measurement information. As noted above, the regional server systems 112 can also transmit other types of information including (but not limited to) UI map information, or navigation information.

In particular embodiments, magnetic navigation devices 110 can continuously provide magnetic measurement information to the magnetic navigation system 100 (e.g. to regional server systems 112 or a main server system 116). In particular embodiments, magnetic navigation devices 110 periodically provide data logs of magnetic measurement information. In certain embodiments, magnetic navigation devices 110 report magnetic measurements based upon network connectivity. For example, a magnetic navigation device 110 may wait until connected to a broadband Internet connection (e.g. via a WIFI access point) to upload magnetic measurement data logs to server systems (112 or 116) within a magnetic navigation system 100. The specific manner in which data are exchanged between magnetic navigation devices and servers within a magnetic navigation system is largely dependent upon the requirements of specific applications.

Figure 1B:
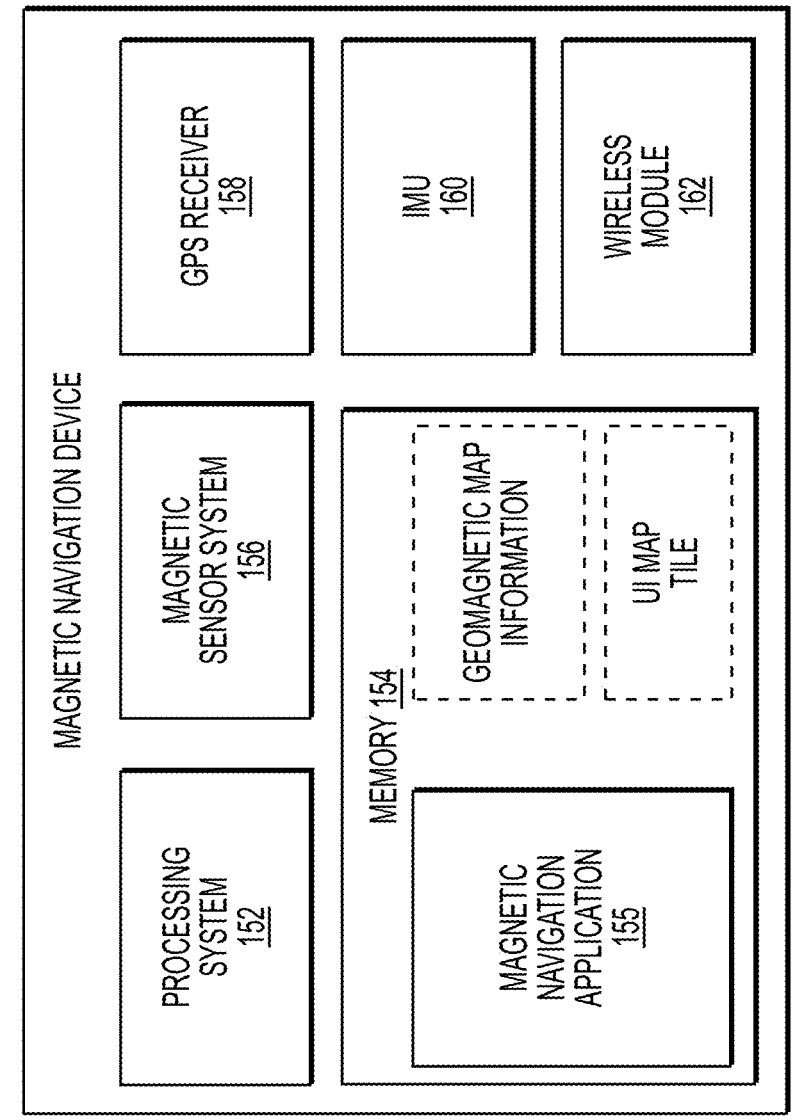
FIG. 1B illustrates an example magnetic navigation device.

FIG. 1B illustrates an example magnetic navigation device. The magnetic navigation device 150 includes a processing system 152 in communication with a memory 154 containing a magnetic navigation application 155. The processing system can be implemented using a general-purpose microprocessor, a microcontroller, a digital signal processor, a graphics processing unit, or any combination of application specific or software-controlled devices capable of performing logic operations or computations. In particular embodiments, the memory 154 includes a non-volatile memory system. In certain embodiments, the magnetic navigation application 155 is temporarily downloaded and stored in memory 154. In particular embodiments, the memory 154 can also be utilized to store additional data including (but not limited to) geomagnetic map information, UI map information (e.g. map tile image files), or navigation information. As noted above, magnetic navigation devices in particular embodiments can locally store map information to enable magnetic navigation in the absence of a network connection.

The processing system 152 is also in communication with a magnetic sensor system 156. In the illustrated embodiment, the magnetic navigation device also includes a GNSS receiver 158, an inertial measurement unit (IMU) 160, and a wireless communication module 162 in communication with the processor 152. In particular embodiments, GNSS receiver 158, IMU 160, or wireless communication module 162 can be utilized to obtain location information that can be utilized by the magnetic navigation application 155 in combination with or as an alternative to location information derived from magnetic measurements obtained using the magnetic sensor system 156. In particular embodiments, the wireless communication module 162 can also be utilized to obtain supplemental location information. The wireless communication module 162 can also be utilized to communicate with server systems within the magnetic navigation system to obtain geomagnetic maps information or transmit data related to magnetic measurements. While various magnetic navigation device architectures are described above with reference to FIG. 1B, any of a variety of architectures can be utilized including (but not limited to) architectures in which the GNSS receiver or wireless communication module perform the functions attributed above to a separate processor or memory (hence eliminating the need for a separate processing system or memory component). Accordingly, many different magnetic navigation device implementations can be utilized including fewer components or additional components to the components shown in FIG. 1B as appropriate to the requirements of specific applications in particular embodiments.

Referring again to FIG. 1A, in particular embodiments, the regional data servers 112 can be configured to accumulate transmitted magnetic measurement information 114 received from magnetic navigation devices 110. The accumulated magnetic measurement data can be used to generate updated geomagnetic map information for specific regions. The regional data servers 112 can then transmit geomagnetic map updates (e.g. updated geomagnetic map patches) to a main server system or multiple server systems located in geographically disparate data centers, where the geomagnetic map updates can be utilized to perform updates with respect to a global geomagnetic map. The specific manner in which magnetic measurements sourced from multiple magnetic navigation devices can be utilized within a single server system or within a hierarchy of server systems to update regional or global geomagnetic maps is largely dependent upon the requirements of specific applications in particular embodiments. Processes for collecting magnetic measurements and updating geomagnetic maps in particular embodiments are discussed further below.

In particular embodiments, the magnetic navigation system can "patch" or improve a global geomagnetic map of the GMF. For example, magnetic navigation servers (e.g. a main server system 116) can maintain a geomagnetic map that may be a dual redundant "master map" of the GMF of the globe to avoid interruption of the service in the case of a corrupted master file. The master geomagnetic map can serve as a baseline from which to establish higher resolution geomagnetic maps that can be used for detailed magnetic navigation. In particular embodiments, the master geomagnetic map stored in, for example, one or all of the main servers of the magnetic navigation system can be based on data received from an EMAG2 (Earth Magnetic Anomaly Grid 2-arc minute resolution) data model. Additionally, the master geomagnetic map may contain layers of additional data that contain rough gradient maps of the GMF as well as other information such as susceptibility and conductivity. In particular embodiments, the various layers of additional data can be updated periodically or in real time as information is generated from magnetic navigation devices and fed into the regional servers. Likewise, the master geomagnetic map, in particular embodiments, can be updated or improved to have a greater resolution than the baseline EMAG2 model. Accordingly, the master geomagnetic map, as updated, can be used for improved localization or navigation.

In particular embodiments, the magnetic mapping data can be provided in multiple layers of two dimensional data based on height of the magnetic device. For example, some devices may be in aerial vehicles while others are closer to the ground, while still other devices may be located within buildings at different heights. Accordingly, various embodiments of the system programming can extrapolate the two dimensional data sets to render a three dimensional data set in order to generate a more refined three dimensional map of magnetic anomalies. Accordingly, three-dimensional data sets can be stored in the main server. Likewise, some embodiments may utilize the three dimensional data set for localization.

Updating of global geomagnetic maps in particular embodiments involves capturing magnetic measurement information using magnetic navigation devices active within the magnetic navigation system. In particular embodiments, magnetic measurement information can be generated by magnetic navigation devices and stored or provided to the magnetic navigation system in a number of different formats including (but not limited to) decimal data, TINYINT (tiny integer), or integer data formats. Likewise, the values of the data can be provided in any number of value types such as degrees (e.g. representing latitude and longitude values), and metric or English measurement systems to represent the respective resolutions or cell sizes. It should be understood that the combination of such values can be used to generate magnetic information capture trajectories, which can be referred to simply as trajectories, for each of the individual magnetic navigation devices that are operational within the magnetic navigation system or capturing magnetic measurement information for use within the magnetic navigation system. In some embodiments, the trajectories can be provided to the magnetic navigation system by the magnetic navigation devices using a variety of different data formats or values. For example, Table 1 below illustrates trajectory data generated in particular embodiments.

TABLE 1

| Name of data field | Data description | Data value | Data format |
|---|---|---|---|
| Device_ID | Unique device id (IMSI) | 15-digit number | CHAR(15) |
| TIME_STAMP_BEGIN | stamp of the start of the trajectory | '1970-01-01 00:00:00' UTC | TIMESTAMP |
| Device TYPE | (CAR, PEDESTRIAN, DRONE, etc.) | enum | TINYINT |
| EQUIPMENT | Magnetometer type | string | VARCHAR |
| TRAJECTORY | Trajectory | Binary presentation of the trajectory | VARBINARY (MAX) |

The TRAJECTORY data structure can be implemented in the manner detailed below:

TRAJECTORY: array of elements of the "POINT" type.

POINT: {
double lat;
double lon;
float height;
float heading;        // magnetic heading
time_t timestamp;     // timestamp of the current measurement
double accelerometerX;
double accelerometerY;
double accelerometerZ;
double mag_x;
double mag_y;
double mag_z;
double suscept;
double conductivity;
float v_accuracy;     // GNSS Vertical Accuracy(m); −1 if unavailable
float h_accuracy;     // GNSS HorizontalAccuracy(m) −1 if unavailable
short mode; // 0 - regular mode; 1 - GNSS-denied mode; 2 - Network-denied mode; 3 - blind mode.
};

Any of a variety of data structures can be utilized for reporting magnetic measurements as appropriate to the requirements of specific applications in particular embodiments.

In particular embodiments, magnetic measurement information directly reported by magnetic navigation devices or contained within trajectories reported by magnetic navigation devices can be used to update a baseline magnetic map that can include data parsed from the EMAG2 data set. EMAG2 data can be used as a baseline for determining the level of resolution that may be needed to improve functionality of the overall magnetic mapping system. For example, the level of possible resolution improvement can be determined by the localization accuracy of GNSS device data and the update rate of magnetic sensors specific to each device in the system.

In particular embodiments, the data of key relevance can include (but is not limited to) the magnetic data related to latitude, longitude, height (altitude), and device type. The rough layer data, in particular embodiments can contain various values or data sets related to the geographic location of the device. This can be extremely useful in determining the types of magnetic anomalies that may be already known and accounted for in the overall resolution improvement. Additionally, susceptibility and conductivity data can be generated by the devices within the region. Such data can be used to establish the various trust coefficients associated with each device. Trust coefficients can act, in particular embodiments, as a weighted coefficient that can help determine the level of accuracy of the data being provided and subsequently used to determine the trajectory data for the device.

As discussed previously with respect to FIG. 1A, the regional servers can be used to pre-process the magnetic measurement information provided by magnetic navigation devices. In particular embodiments, the magnetic navigation system may utilize the regional servers to generate updates for regions or "patches" of data for a global geomagnetic map. The updates can be implemented as additional layers of data or using any of a variety of data structures reflecting the modifications to the underlying global geomagnetic map information. In particular embodiments, regional servers can create geomagnetic map patches for a master geomagnetic map based upon trajectories that can be generally categorized by device type and device hardware. For example, the magnetic navigation system can weigh the reliability of information (e.g. magnetic measurements by a cellular phone versus a vehicle mounted magnetic navigation device), based upon factors including (but not limited to) the sensitivity or reliability of the magnetometers utilized by the magnetic device, or the reliability of other positioning information generated by the magnetic navigation device. The different device trajectories can be collected by the various regional servers 112 and the magnetic measurement information contained within the trajectories can be processed by the regional servers to create a geomagnetic map patch for use in the updating of a global geomagnetic map. The geomagnetic map patches can be transmitted to a main server system to update the global geomagnetic map.

While much of the discussion above relates to the use of trajectories to provide magnetic measurement information for the purpose of updating global geomagnetic maps, methods based upon transmitting trajectory data are simply implementations that can be useful because they do not rely on the need for continuous transmission of magnetic measurement information by magnetic navigation devices. As such, use of trajectories can enable magnetic navigation systems to aggregate magnetic navigation data at advantageous times (e.g. when low cost/high speed network connectivity is available to magnetic navigation device). Accordingly, magnetic measurement information can be provided using any of a variety of different data structures or at any of a variety of communication frequencies as appropriate to the requirements of specific applications in particular embodiments.

Figure 2:
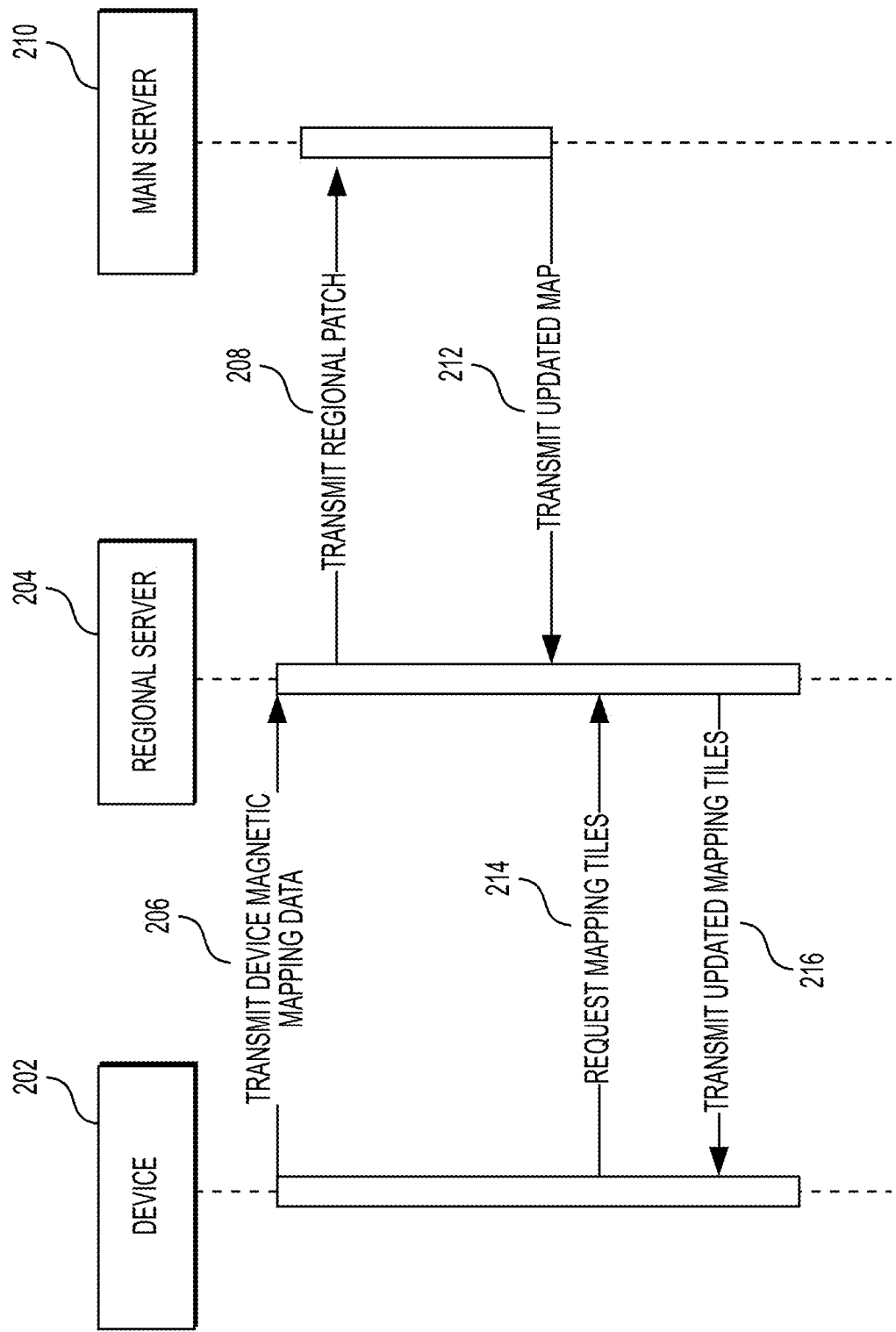
FIG. 2 is an example sequence diagram for an example magnetic navigation system.

FIG. 2 is an example sequence diagram for an example magnetic navigation system, conceptually illustrating communication between a magnetic navigation device and server systems within a magnetic navigation system in particular embodiments. In particular embodiments, a magnetic navigation device 202 can be configured to communicate wirelessly with a regional server 204. In particular embodiments, the magnetic navigation device 202 can transmit magnetic mapping information 206 generated from the device to the regional server 204. The regional server 204 can perform a number of operations as will be discussed below to analyze and process the incoming data from magnetic navigation devices to generate updates to geomagnetic maps. In the illustrated embodiment, the magnetic measurement information received from magnetic navigation devices is utilized to generate a geomagnetic map patch data set that can be transmitted 208 to a main server 210 to be used in updating a global geomagnetic map. As discussed above, updates to the global geomagnetic map can take the form of an additional layer of information within the global geomagnetic map. In particular embodiments, the main server 210 can transmit updated geomagnetic map data 212 to a regional server for storage and distribution to magnetic navigation devices. When the magnetic navigation device 202 next requests 214 geomagnetic map data to perform navigation, updated geomagnetic map files 216 can be provided by the server 204 and utilized by the magnetic navigation device to perform localization or navigation. Geomagnetic map information can be region specific. Therefore, the magnetic navigation device 202 need not request the full global geomagnetic map, but can instead requests geomagnetic map cubes or tiles for specific regions. For example, many magnetic devices may have varying degrees of uncertainty that may require two dimensional or three dimensional data for localization/navigation. If a magnetic device is located on or under a bridge then three dimensional GMF information can be provided in cube to allow for navigation. Other examples may include a vehicle on a roadway that may not need anything more than two dimensional data for localization and would thus be provided with tiles. In particular embodiments, the magnetic navigation device can download UI map tiles 216 to allow for the magnetic navigation device to display an appropriate UI as it continues along a trajectory.

Figure 3:
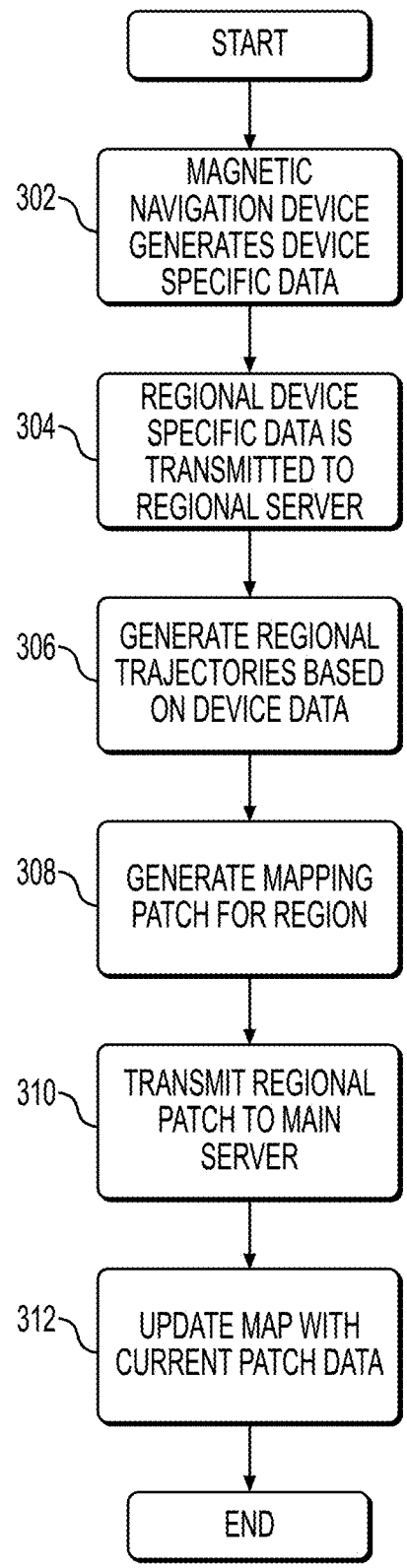
FIG. 3 illustrates an example method for generating example magnetic mapping data.

FIG. 3 illustrates an example method for generating example magnetic mapping data. In particular embodiments, a magnetic navigation device captures 302 magnetic measurements using magnetometers present on the device. The measurements made by the magnetic navigation device are specific to the magnetic navigation device in the sense that they are dependent upon the location of the magnetic navigation device and the specific magnetometers employed by the magnetic navigation device. In particular embodiments, each magnetic measurement made by a magnetic navigation device includes (but is not limited to) three components of magnetic field strength that are measured together with localization and attitude data from a GNSS/INS or any reliable navigation system. In particular embodiments, the localization information can be supplemented with additional localization data including (but not limited to) localization information derived from measurements within a digital communication system or IMU measurements. In certain embodiments, magnetic measurements, together with information including (but not limited to) navigation log data and magnetic navigation device type, sensor type or accuracy of localization information can be transmitted and stored by the navigation system (e.g. in the regional servers) for use in calculating updates to a global geomagnetic map. In particular embodiments, the magnetic measurement information can be illustrated by equation 1 below:

$$H=[H_x H_y H_z]=f(t, x, y, z, x^\bullet, y^\bullet, z^\bullet, \phi, \theta, \psi, ms) \qquad (1)$$

where t is time, (x, y, z) and (x•, y•, z•) are the coordinates and velocities given in ENU/NED coordinate system already transformed to the given region by the servers, (φ, θ, ψ) are roll, pitch, and yaw angles, ms is a message status. Any of a variety of magnetic measurement information formats can be utilized (including different formats for different devices) as appropriate to the requirements of specific applications in particular embodiments.

In particular embodiments, magnetic measurement information generated by a specific magnetic navigation device can include a variety of different elements including, as described above, information identifying the device hardware utilized to capture the measurements as well as the reliability of such hardware. Additionally, regional device specific data can take into account other variables, such as (but not limited to) local anomalies, that can affect the regional magnetic field. Anomalies can be any number of objects that can provide information of the local magnetic field such as buildings, bridges, tunnels, cell towers, lampposts, any number of man-made objects, or any geographical features that may be unique to the region.

Magnetic measurement information generated by a specific magnetic navigation device can be transmitted to a regional server for further processing 304. The regional server can generate regional trajectories 306 based on the regional device specific data. Alternatively, the magnetic navigation devices can provide magnetic measurement information as trajectories. In particular embodiments, the magnetic measurements can then be used to generate regional geomagnetic map patches 308 that can be transmitted to a main server system 310. The main server can use the geomagnetic map patches to update a global geomagnetic map 312 with the patches received from the regional servers. As noted above, these updates can be reflected as additional layers of the global geomagnetic map maintained by the main server system.

In reference to the magnetic measurements or local anomaly data that can be collected by the variety of regional devices, such data can be assigned by different trust or confidence levels that can be used in the overall calculation of the geomagnetic map patch data. Trust or confidence levels, in various embodiments, can be referred to as probabilistic layers and can be calculated based on the number of magnetic navigation devices that reported the anomaly, repeatability of measurements across different magnetic navigation devices, the accuracy and types of magnetometers used to collect the magnetic measurements, whether the magnetometer is a recognized device, motion type, or reliability of localization (GNSS data) as well as seasonal variations that can affect the local magnetic field. Additionally, probabilistic layers can contain other types of information such as information describing known local anomalies including (but not limited to) materials present within known local anomalies. Materials can have various effects on the characteristics of a local magnetic field. Local anomalies such as buildings, bridges, roads, etc. can be made from any number of materials. Additionally, such anomalies and their respective materials can relate to the relative susceptibility and conductivity information seen by devices. Accordingly, databases can be established or utilized that include the known magnetic properties of various types of materials such that corrections to magnetometers can be made and or included in the corresponding calculations for generating geomagnetic map patches utilized in the updating of a global geomagnetic map. In particular embodiments, the data can be filtered into various types of probabilistic layers such as device susceptibility and conductivity data. In various embodiments, the probabilistic layers can include but are not limited to device or object coordinates, values vectors for the local magnetic field, gradient vectors for the local magnetic field, magnetic susceptibility values, electrical conductivity values, and magnetic navigation device type layers.

In particular embodiments, geomagnetic maps are created using a variety of magnetic navigation device measurements including measurements made via a more precise measurement platform of sensors and measurements made using less expensive sensors. For example, some magnetic navigation devices may contain GNSS and INS solutions, Novatel Synchronous Position elements, Attitude and Navigation (SPAN) technology, such as PwrPak7-E1. These magnetic navigation devices may be capable of providing time, position, velocity, and attitude parameters. In particular embodiments, magnetic measurements obtained by magnetic navigation devices that have more reliable magnetic measurement platforms are accorded a higher level of trust (or confidence) within the probabilistic layers utilized to determine updates to a global geomagnetic map. In contrast, magnetic navigation devices with less accurate components and technologies may be afforded a lower trust level. The less accurate components, such as magnetometers in cellular devices, can be relatively reliable for localization and navigation despite the level of noise that can be produced by some of these less accurate sensors.

Magnetic navigation systems in particular embodiments can utilize a larger number of magnetic measurements captured using less precise magnetic sensors or localization techniques to build highly reliable and accurate geomagnetic maps with improved resolution. For example, many embodiments can capitalize on the errors or noise that is often produced from less accurate sensors because similar sensors tend to produce the same or similar errors which make them very predictable. Accordingly, the sensor data, including the errors, can be used for generating rough mapping data as well as for localization on a rough scale; where rough is inclusive of data containing the known errors or noise. The collection of many magnetic measurements from the same or similar types of noisy sensors to represent the rough map can be useful in developing patches for the global geomagnetic map by utilizing processes including (but not limited to) quantization of GMF gradient values. While much of the discussion above relates to the use of magnetic navigation devices to gather magnetic measurements, magnetic navigation systems in particular embodiments can also receive magnetic measurements from dedicated magnetic measurement devices that incorporate very precise geolocation and magnetic field measurement technologies. In this way, the magnetic navigation system can periodically capture extremely precise magnetic measurements within specific regions to continuously improve upon the global geomagnetic map information available to magnetic navigation devices. Accordingly, references to obtaining magnetic measurements using magnetic navigation devices herein should be understood as encompassing obtaining measurements using dedicated magnetic measurement devices that also form part of the magnetic navigation system. Any of a variety of strategies can be employed for gathering magnetic measurements and processing the magnetic measurement information to generate reliable geomagnetic map information for use in localization or navigation as appropriate to the requirements of specific applications in particular embodiments.

In particular embodiments, methods of updating a global geomagnetic map can follow a systematic process of obtaining magnetic measurement information from magnetic navigation devices in a region and then assigning the magnetic measurement information to a probabilistic layer for processing. Furthermore, probabilistic layers can be compared for similarities in magnetic measurement information to generate an overlay of magnetic measurement information useful in generating updated geomagnetic map patches. Magnetic measurements, similar to those discussed above, can be saved and accumulated in a (distributed) data base so that they are available for use in the generation of updates to a global geomagnetic map. In particular embodiments, probabilistic layers or magnetic measurement data sets can be compared over time. In other words, magnetic measurements in a region over time can be compared in order to establish a reliable set of data useful for producing updates to a global geomagnetic map. Magnetic measurements that take into account the change in data over time can be illustrated by equation 2 below:

$$M = [Hx(t1) \ldots Hx(tN) Hy(t1) \ldots Hy(tN) Hz(t1) \ldots Hz(tN)] \quad (2)$$

where three-dimensional components of GMF are measured over time intervals $t1 \ldots tN$. The magnetic measurements (consecutive readings of magnetometers) are dependent on the object's motion, which can be characterized by three linear velocity components $\Delta x$, $\Delta y$, $\Delta z$, three angular rate components $\Delta \gamma$, $\Delta \theta$, $\Delta \psi$ and the update rate of the sensor system utilized to capture the magnetic measurements $\Delta t = \Delta ti - \Delta ti - 1$.

FIG. 4A is an example time overlay of various example magnetic profiles in an example region, conceptually illustrating capture of magnetic measurements over different time intervals in a given region. During a first-time interval 402, two magnetic navigation devices capture magnetic measurements while traversing two different paths within the same region of the GMF. Within second- and third-time intervals (404 and 406), additional magnetic navigation devices capture magnetic measurements while moving through the region. Magnetic measurements made within a cell 408 of the region at different times are indicated. Given the uncertainty of the location or trajectories of the magnetic navigation devices, subsequent processing of the magnetic measurements can account for uncertainty both with respect to the magnetic measurements and the locations of the magnetic navigation devices at the points in time at which the magnetic measurements were made. For the purposes of processing, each magnetic measurement can be assigned to a corresponding resolution cell within the region (e.g. the cell most likely to contain the location of the magnetic navigation device at the time at which the magnetic measurement was made). The GMF in the corresponding cell can be a function of 3D coordinates similar to those illustrated in equation 2 above. The 3D coordinates can be illustrated by equation 3:

$$GMF(Hx, Hy, Hz) = f(x, y, z) \quad (3)$$

The determined spatial field can be replaced by a set of random trajectories; namely magnetic profiles, which are in turn functions of an object's motion and illustrated in equation 4 below:

$$M(Hx, Hy, Hz) = m(\Delta x, \Delta y, \Delta z, \Delta \gamma, \Delta \theta, \Delta \psi, \Delta t) \quad (4)$$

In particular embodiments, equations 3 and 4 above can be convolved to contain the change in time Δt that can be associated with probabilistic estimates of coordinates, velocities, and orientations during mapping by using techniques such as (but not limited to) Gaussian Process regression (GPR). In some embodiments, the magnetic measurements that are collected by the various magnetic navigation devices within a region can be fitted to the same time interval and compared using approximate coordinates. In particular embodiments, this is performed in a manner that accounts for potential errors or noise that could be generated from any given instrument. Accordingly, navigation systems in particular embodiments can utilize the collected magnetic measurement information to determine a magnetic gradient field utilizing the matrix provided in equation 5 below:

$$\begin{bmatrix} H_x(t_2) - H_x(t_1) & \dots & H_x(t_N) - H_x(t_{N-1}) \\ H_y(t_2) - H_y(t_1) & \dots & H_y(t_N) - H_y(t_{N-1}) \\ H_z(t_2) - H_z(t_1) & \dots & H_z(t_N) - H_z(t_{N-1}) \end{bmatrix} = \begin{bmatrix} \Delta H_{x1} & \dots & \Delta H_{xN-1} \\ \Delta H_{y1} & \dots & \Delta H_{yN-1} \\ \Delta H_{z1} & \dots & \Delta H_{zN-1} \end{bmatrix} \quad (5)$$

Moreover, magnetic measurements can be transitioned from a previous measurement to a new measurement with interpolation of mapping data and the prediction of Δx, Δy, Δz. When multiple magnetic measurements captured by different magnetic navigation devices are available within a region, analysis can be performed to evaluate the similarities between magnetic measurements such as (but not limited to) through the use of correlation analysis. Accordingly, navigation systems in particular embodiments can utilize similarities between magnetic measurements to construct probabilistic magnetic gradient maps or geomagnetic map patches to be used to update a global geomagnetic map. A probabilistic magnetic field map, according to many embodiments, can combine information from a global reference database and gradient vector (three-axis) geomagnetic map data to improve resolution. In particular embodiments, analysis such as (but not limited to) similarity correlation analysis can be repeated over time to update a probabilistic magnetic gradient map. The correlation of similarities in magnetic measurements is in stark contrast to typical GPS/GNSS methods, which look for differences in measurements to improve accuracy.

For example. FIGS. 4B and 4C illustrate an example comparison between example quantized trajectory data for example sensor and mapping data, showing an example of gradient magnetic mapping data of a sensor with a known error (FIG. 4B) as compared with similar values that may be saved to a map (FIG. 4C). In FIG. 4B, graph 414 shows raw data from sensor and graph 418 shows corresponding quantized data. Similarly, in FIG. 4C, graph 416 shows raw data on GMF gradient taken from a map along the linear coordinate X (in meters) and graph 420 contains the same data but quantized. The quantized data can be broken into different quantization levels 412, e.g. as illustrated by the horizontal lines in graphs 418 and 420. Quantization levels 412 can be used to illustrate a quantized trajectory for the respective sensor 414 and the map 416. It can be seen that gradient profile 410b extracted from graph 416 differs from gradient profile 410a from sensor 414 by scale, since the form is preserved. The correspondence between gradient profiles 410a and 410b can be detected and, thus, reliable navigation can be provided. Traditional systems may operate by using error metrics which would compare the absolute or squared differences in the quantized trajectory data would fail at providing matching data sets from which to generate improved magnetic mapping data. In contrast, many embodiments, operate to compare the trajectory data for similarities rather than differences. In some instances, the error metrics can be bounded by 1 (100%) and can provide comparison data results much faster and with greater accuracy than traditional methods of differences.

Figure 4D:
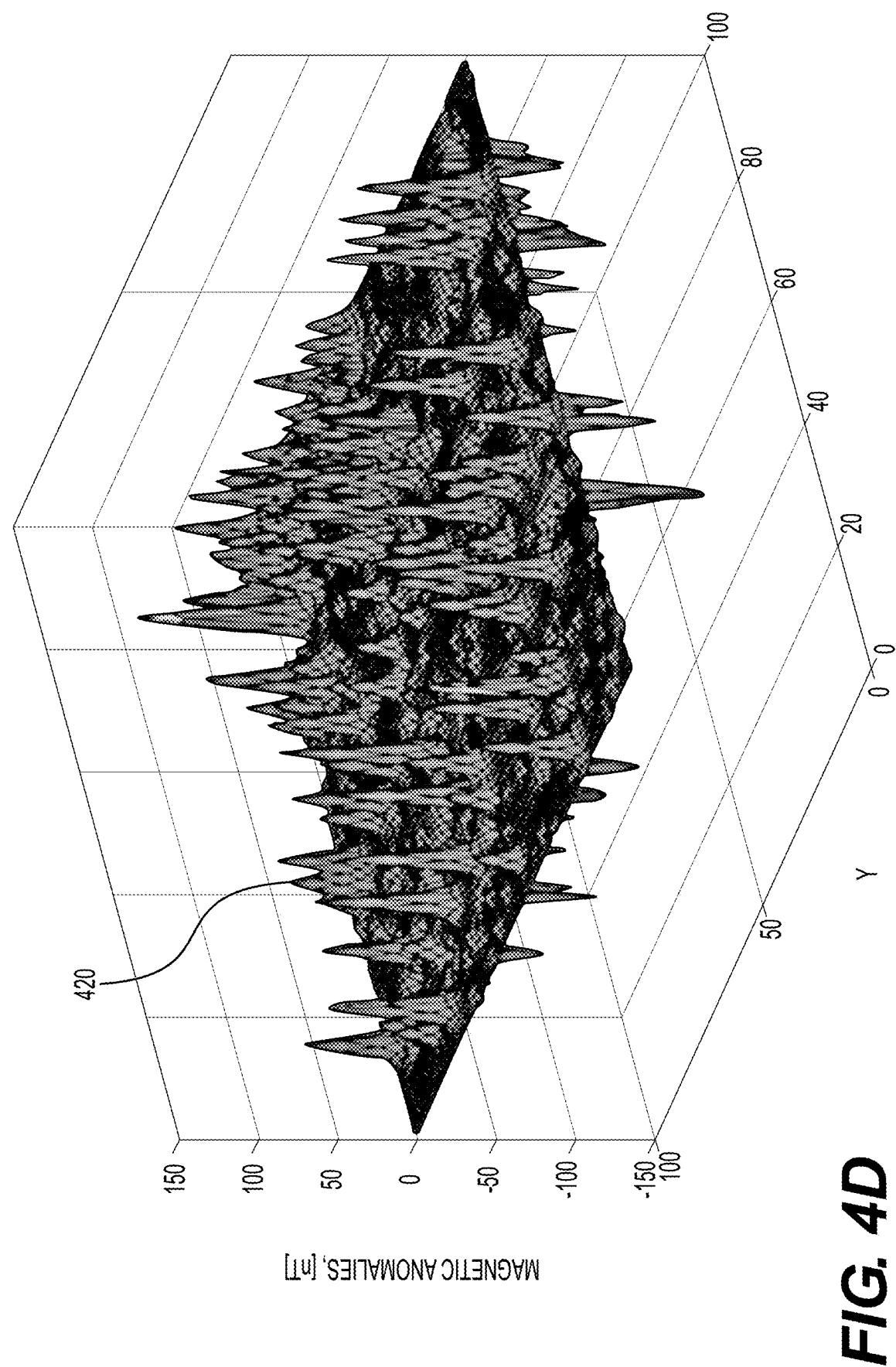
Figure 4E:
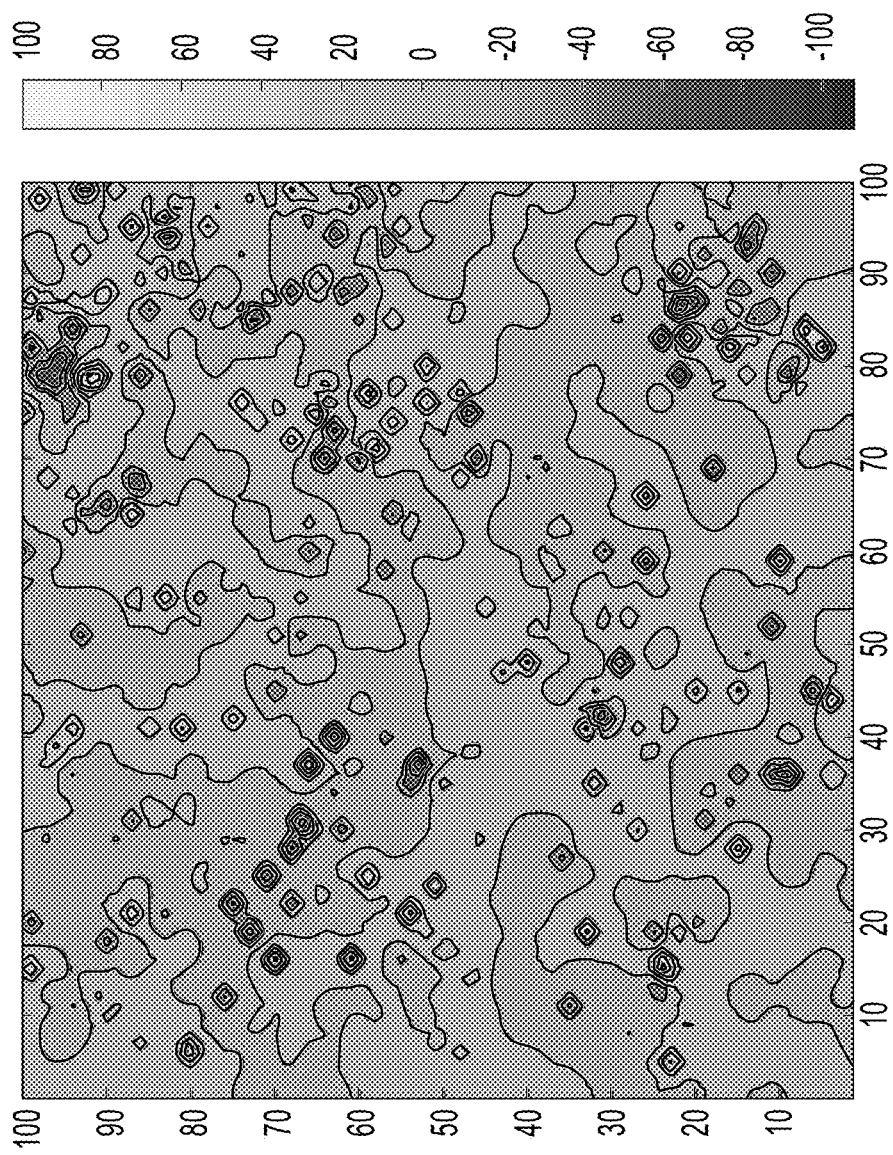
Figure 4G:
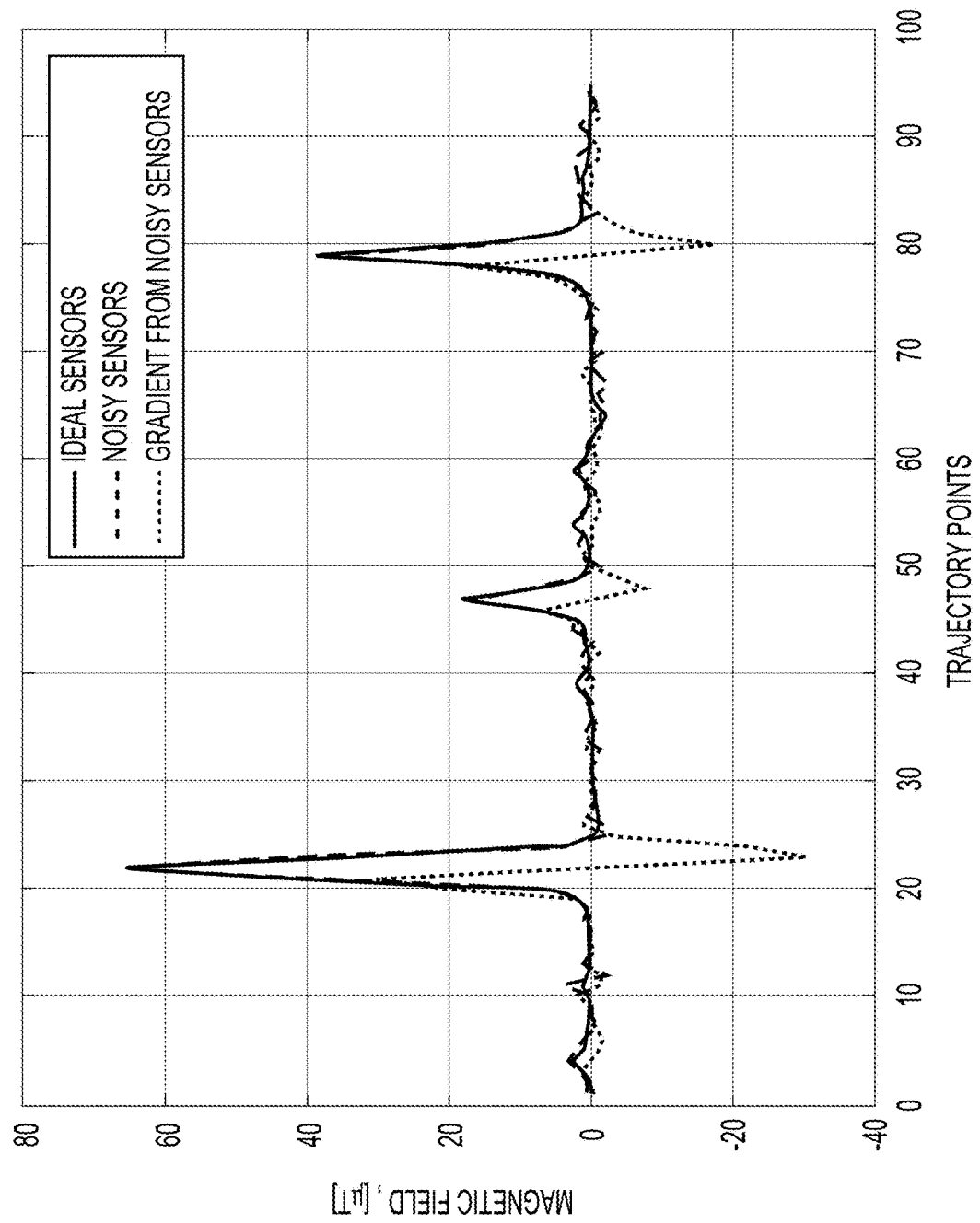
Figure 4H:
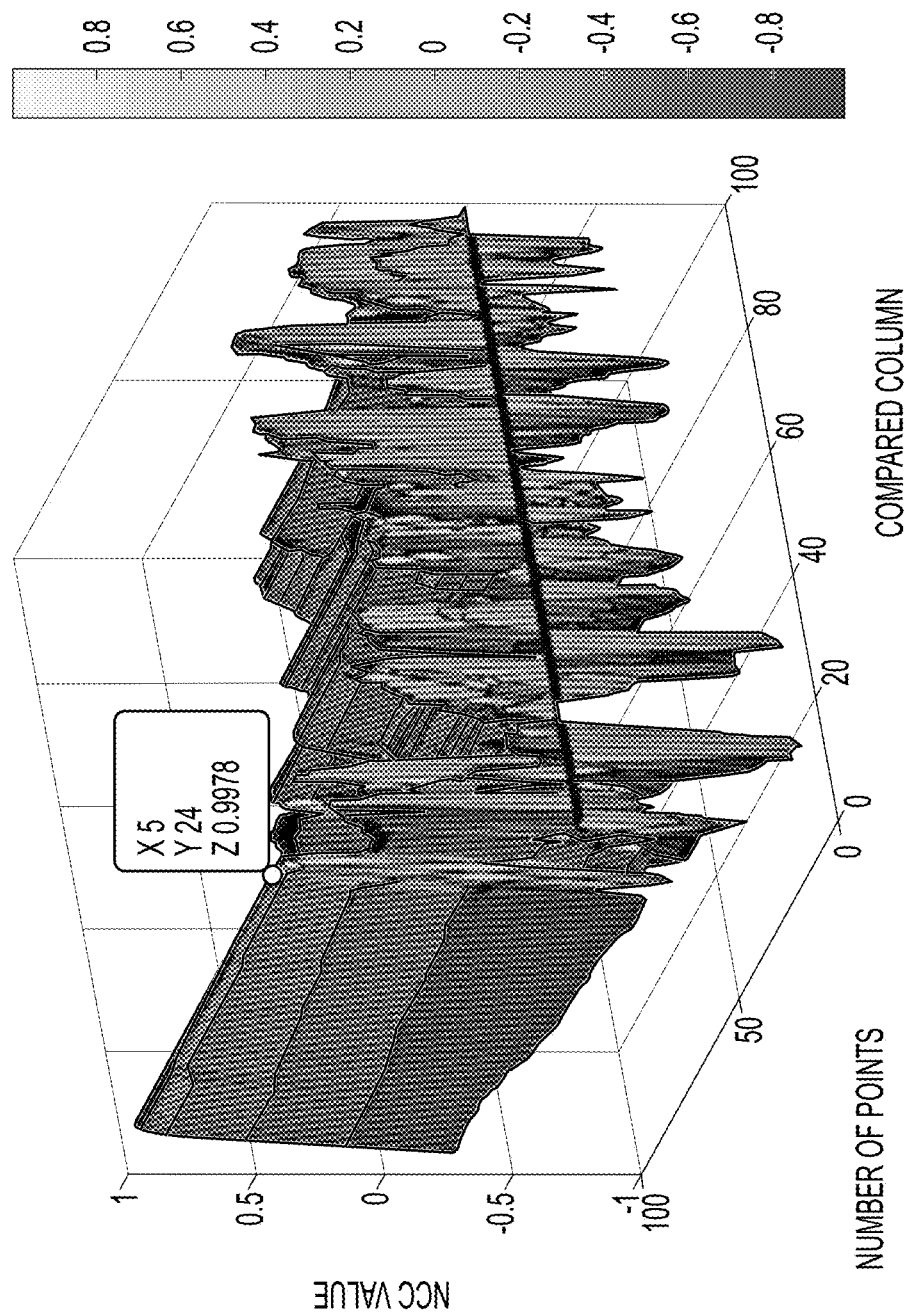
Figure 4I:
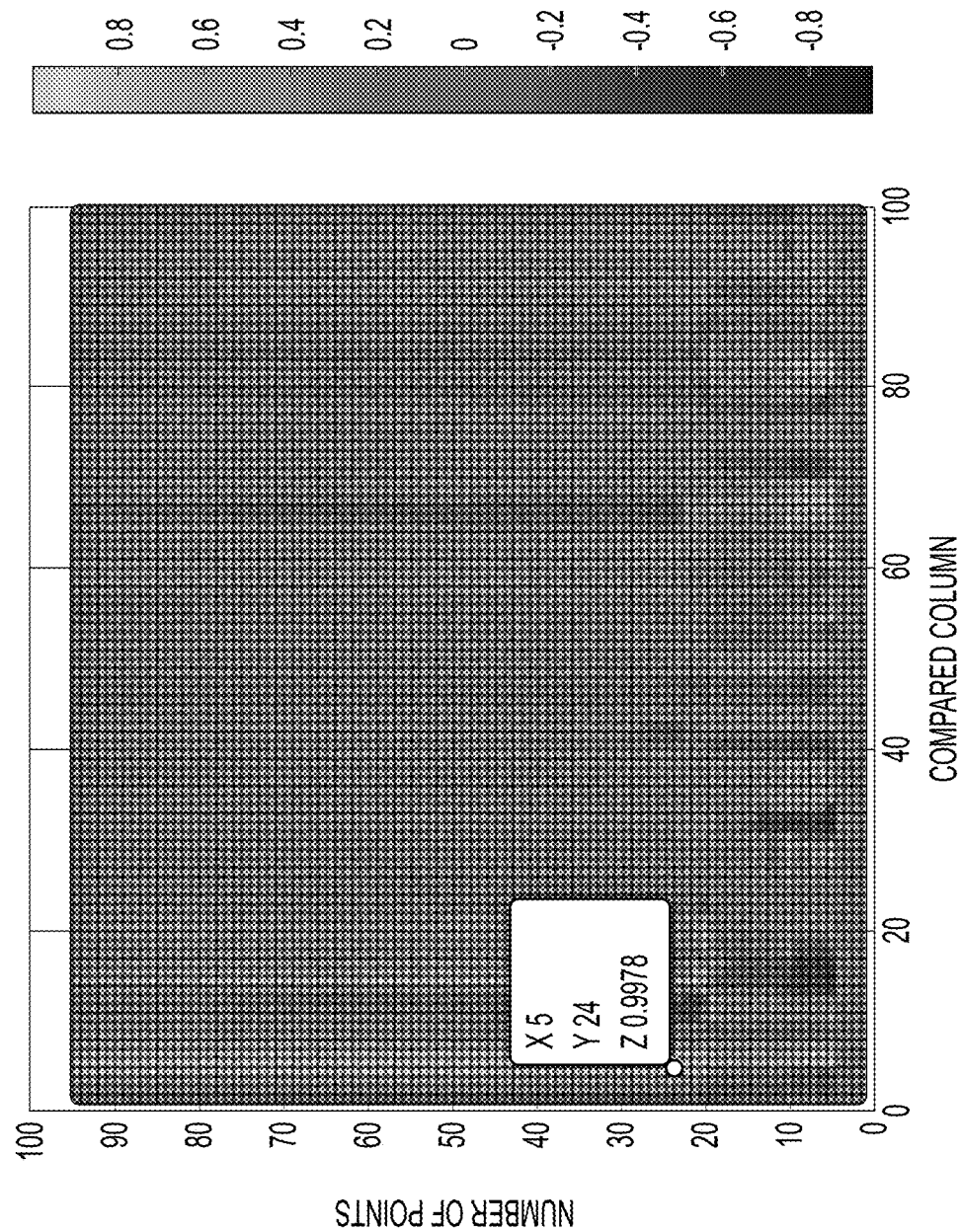

FIGS. 4D-4I illustrate example trajectory data compared for similarities for improved functionality, showing how some embodiments may use similarities in trajectory data for localization purposes. FIG. 4D, for example, illustrates a simulated scalar magnetic field map with various magnetic anomalies 420 represented by the peaks and valleys in the "Z" direction of the map. FIG. 4E likewise illustrates a two dimensional magnetic anomaly map of the same 100×100 square and illustrates the respective intensities of the various anomalies. Using the data from respective magnetic maps, various embodiments can generate gradient mapping data for the respective area as illustrated in FIG. 4F. Simultaneously, a trajectory for any given magnetic device can be generated based on the numerous methods and embodiments illustrated above. An example of a magnetic trajectory and its gradient of an object within an area can be illustrated by the graph in FIG. 4G. Subsequently, many embodiments can then make an overlay comparison between the data trajectories measured by the magnetic device (FIG. 4G) and the map data (FIGS. 4D-4F) which can be illustrated in FIGS. 4H and 4I, where the values of Normalized Correlation Coefficients (NCC) are shown as the result of comparison of known trajectory with a set of others from the map data (FIGS. 4D-4F). The comparison for similarities between the data can result in a most probable trajectory of motion can be found. In such example, the most probable trajectory can be illustrated by the 5$^{th}$ column with the highest NCC value 0.9978 among other comparisons. It can be seen as well from FIGS. 4H-4I that it was enough to compare only the first 24 points from all trajectory (95 points) to obtain the correct value regarding the column number.

In particular embodiments, if a similarity correlation method is not producing a desired level of accuracy within a region, then other correlation methods can be used to help improve accuracy. For example, some embodiments may use correlation criteria functions based on the calculation of a cross correlation function of random processes. In certain embodiments, the magnetic navigation system may use a difference criteria function that may be commonly presented in the field. In particular embodiments, spectral criteria functions can be used to perform a correlation in a spectral domain. In particular embodiments, any of a variety of functions can be utilized for obtaining geomagnetic map information using magnetic measurements made by a variety of magnetic navigation devices as appropriate to the requirements of specific applications in particular embodiments.

Figure 5:
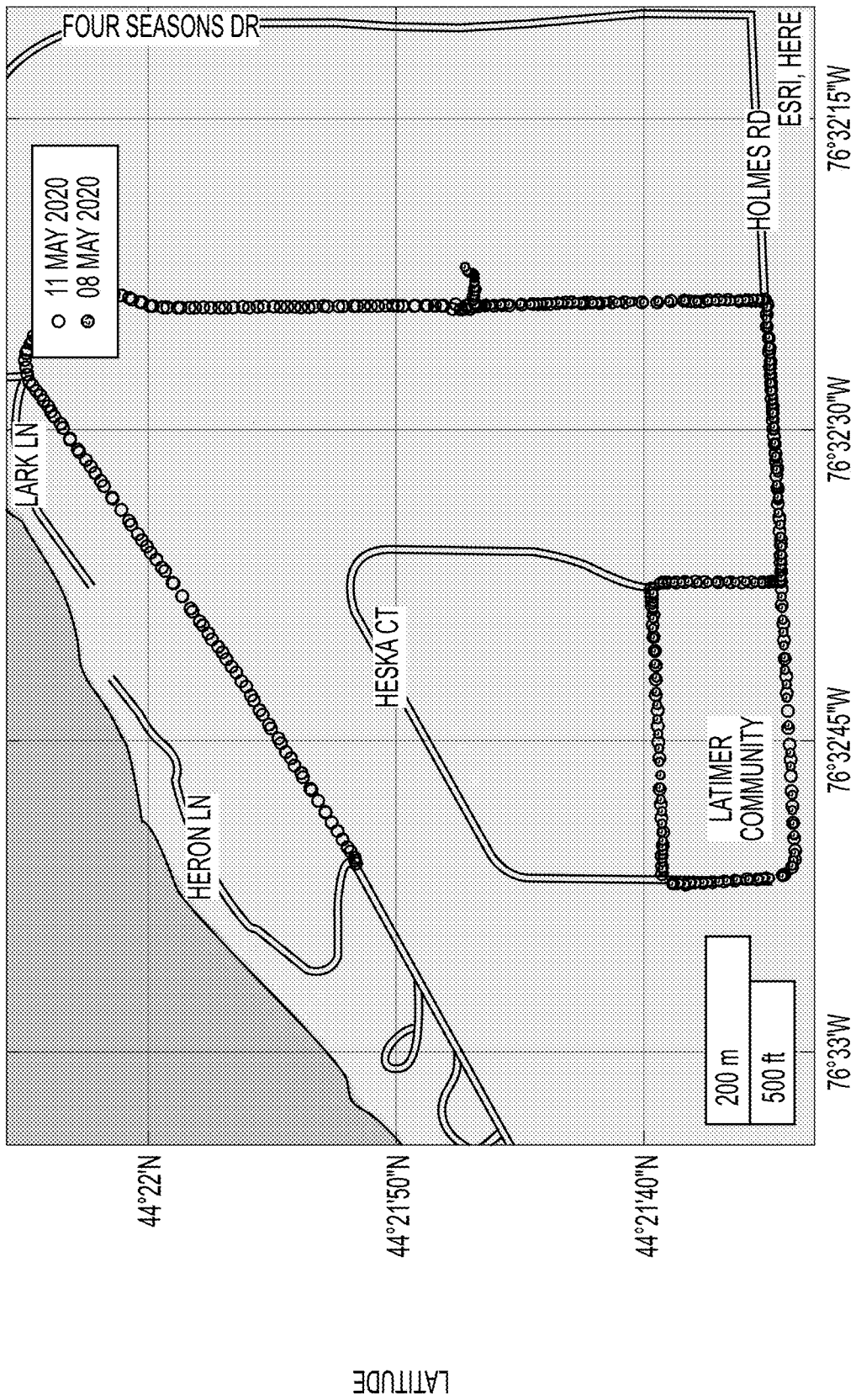
FIG. 5 illustrates example magnetic measurement information over time.
Figure 6:
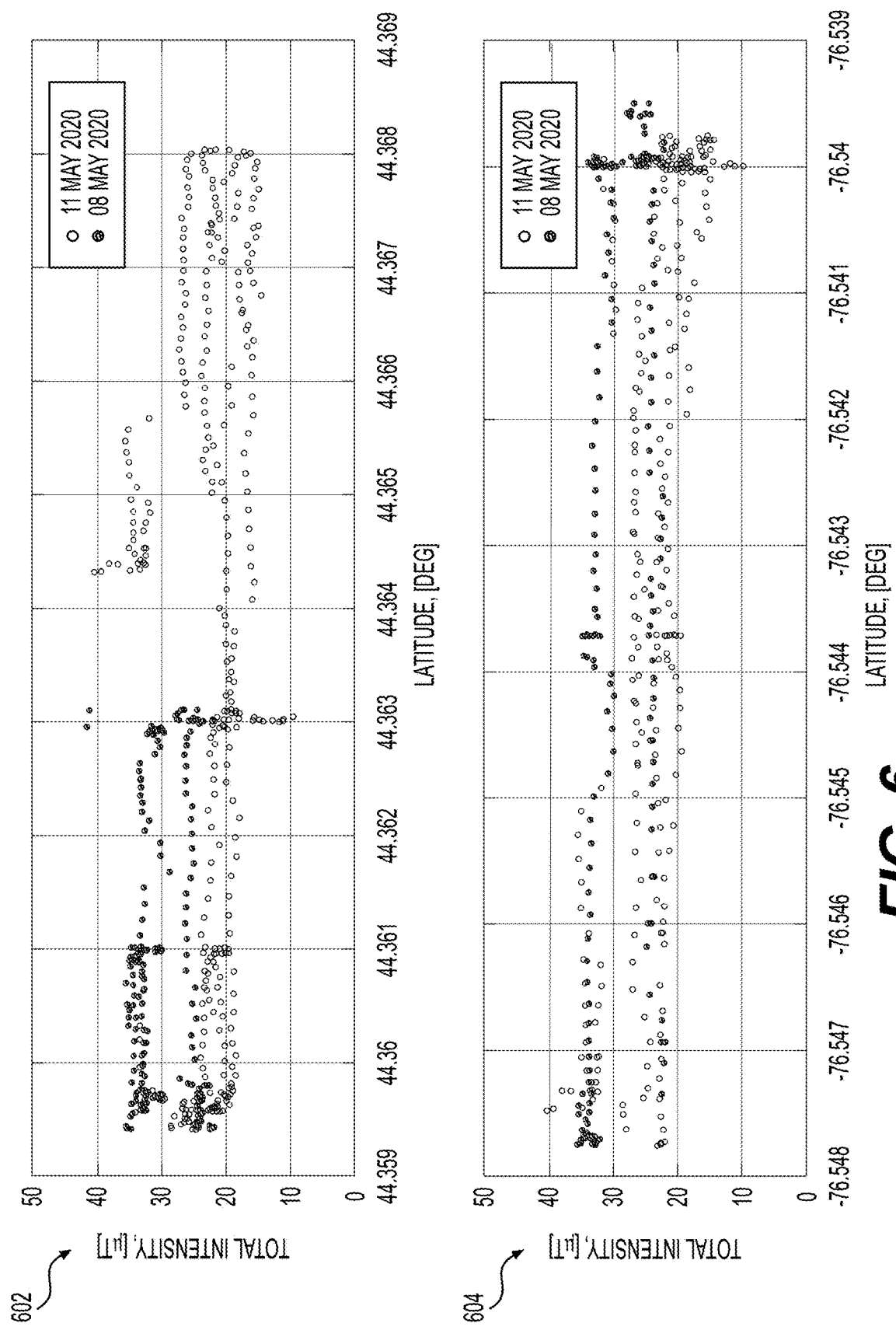
FIG. 6 illustrates example magnetic intensity and location data.
Figure 7:
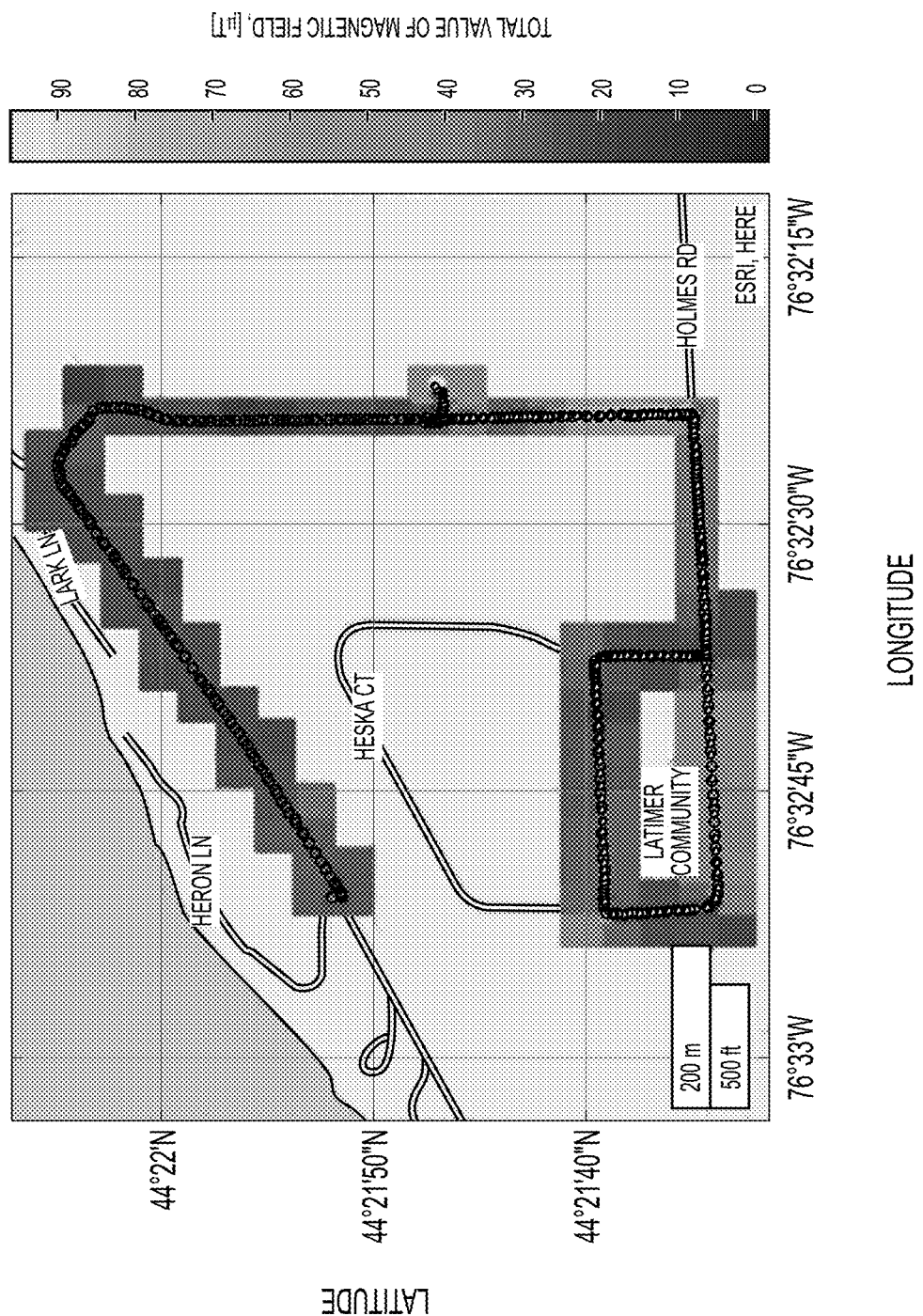
FIG. 7 illustrates an example regional overlap data set of example magnetic intensity and location information.

Referring now to FIGS. 5 through 7, magnetic mapping data sets, in particular embodiments can be illustrated. FIG. 5 illustrates example latitude and longitude trajectory data captured on different days while traversing the same or a substantially similar path within a given region. It can be illustrated that the overlapping data, illustrated along the center line of the curve, can be used to generate improved geomagnetic map information. In various embodiments, the geomagnetic map data can continue to improve with an increasing number of magnetic measurements from a diversity of magnetic navigation devices within the region. Although the different data sets shown in FIG. 5 appear to be somewhat shifted relative to each other, the data sets represent the same path over two different time periods. Conditions can change from day to day and local anomalies can also change thereby affecting the respective data set. However, the overlapping data sets can be compared for similarities, as discussed above, and appropriately determined weighted coefficients can be applied to the data sets to establish greater consistency. The magnetic measurements illustrated in FIG. 5 are also illustrated within the charts shown in FIG. 6. In particular, FIG. 6 shows how the magnetic field was changed for trajectories presented in FIG. 5 separately by latitude (indicated by reference number 602) and longitude (indicated by reference number 604), depending on date (grey and black colors correspondingly). The respective data sets also demonstrate slight shifts but are comparable.

FIG. 7 illustrates an example regional geomagnetic map formed based on magnetic measurements captured by a number of different magnetic navigation devices. The geomagnetic map illustrates corresponding intensities in respective latitude and longitude positions of the map. The greater the number of magnetic navigation devices collecting reliable magnetic measurement information, the greater the amount of overlapping data that can be used to generate high resolution geomagnetic maps of a respective region. In particular embodiments, a magnetic navigation system can implement the methods and systems described above to compile magnetic navigation device specific data and create a geomagnetic map layer in which similar data can be compared and thus used to generate improved resolution geomagnetic data specific to particular classes of device. The specific manner in which magnetic navigation systems process magnetic measurements obtained from different classes of magnetic navigation devices to obtain updated geomagnetic map information is largely dependent upon the requirements of specific applications.

Figure 8:
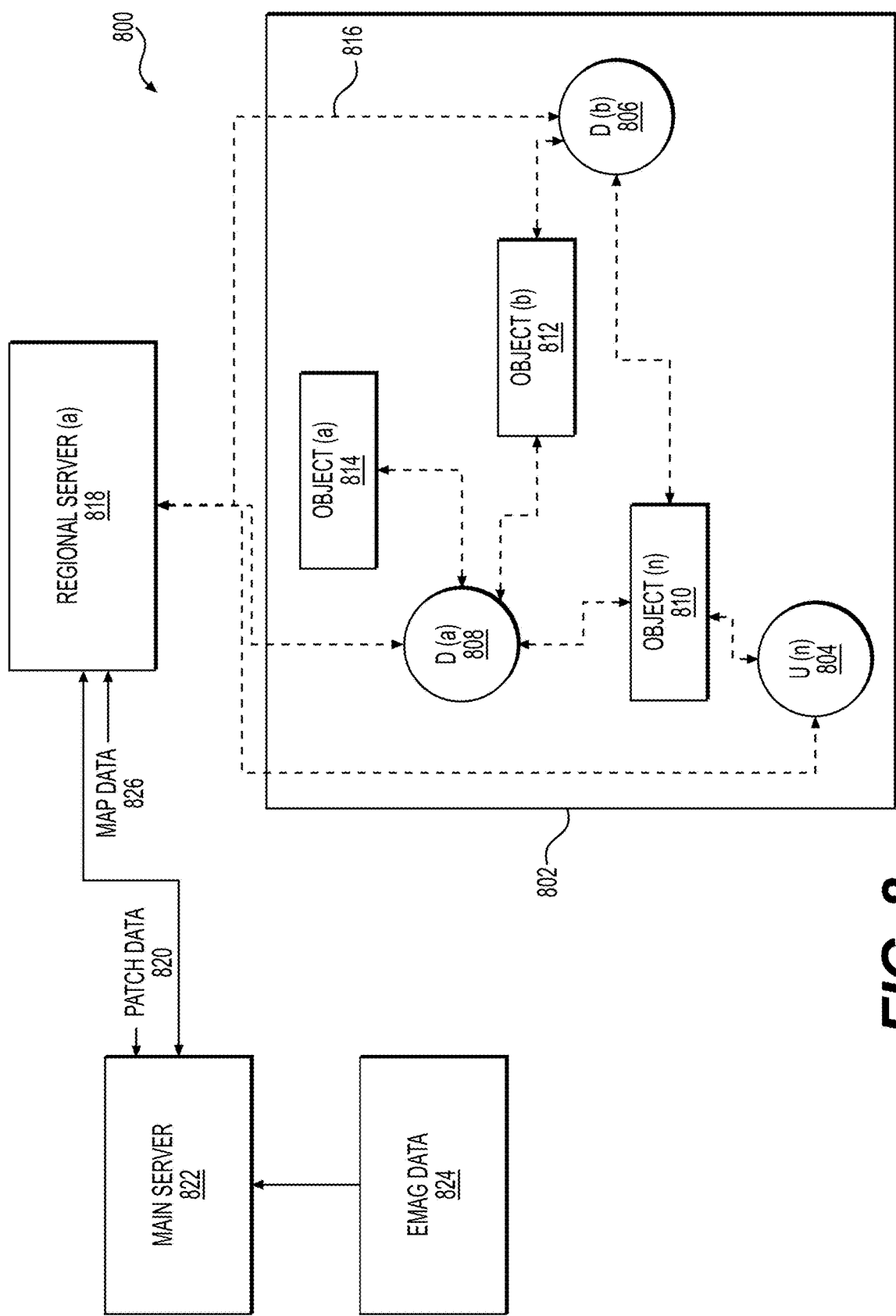
FIG. 8 illustrates an example data transmission scenario.

Turning now to FIG. 8, a magnetic navigation system 800 is illustrated. In particular embodiments, a specified region 802 may have a number of magnetic navigation devices or objects (804-814), such for example as metal objects, cars, high power lines, subway, etc. Each of the respective magnetic navigation devices (804-808) can transmit magnetic measurement information, which may include device profile information 816 to a regional server 818. The individual magnetic measurements can contain information regarding the various objects (810-814) within the region as well as information that may be provided by other magnetic navigation devices. These objects 810-814 may influence the magnetic readings by introducing distortion in GMF. Consequently, the regional server can utilize the various correlation methods as described above to combine magnetic measurements received from different magnetic navigation devices and generate an updated geomagnetic map information such as (but not limited to) a geomagnetic map patch or patches 820 to be sent to the main server 822. In particular embodiments, the main server 822 can combine EMAG data 824 with geomagnetic map patch data to generate an additional geomagnetic map layer with increased resolution relative to the EMAG data 824. As illustrated in FIG. 8, many embodiments enable the transmission of data in both directions. In other words, many embodiments can utilize the system architecture to generate geomagnetic map data 826 as well as provide updated geomagnetic map data 826 to end devices (804-808) that are within the region. Different server systems can be utilized to receive and process magnetic measurements into updated geomagnetic information, and to distribute geomagnetic map information to magnetic navigation devices.

Figure 9:
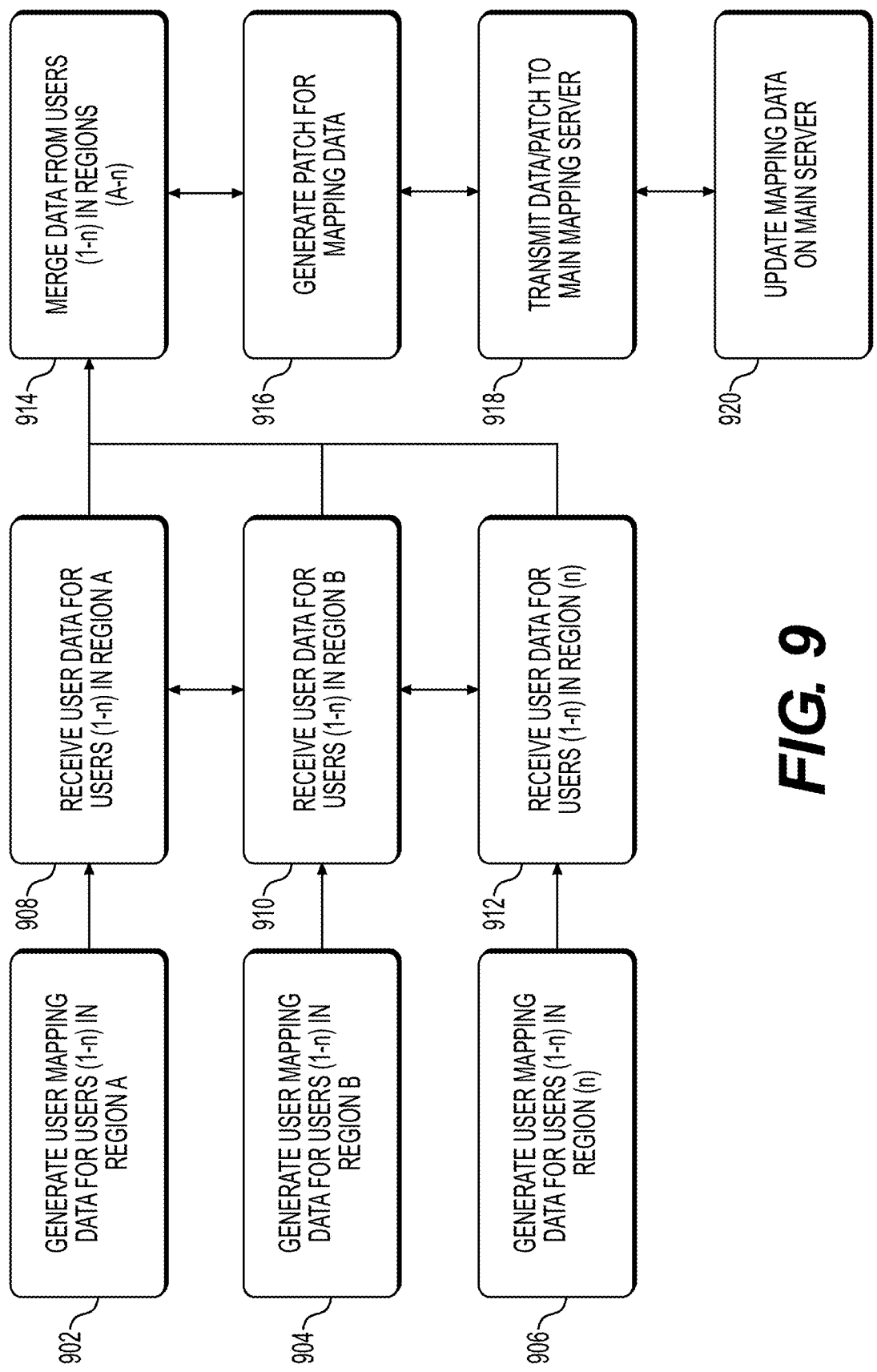
FIG. 9 illustrates an example process for updating example geomagnetic map information.

FIG. 9 illustrates an example process for updating example geomagnetic map information, in which a geomagnetic map having a higher resolution than a baseline set of geomagnetic map information is generated using multiple magnetic navigation devices. In the illustrated embodiment, a number of magnetic navigation devices (1–n) generate magnetic measurement information based on their presence within given regions (902-906). Each of the regional servers can then receive or share the magnetic measurement information between the servers (908-912). Once the magnetic measurement information has been compiled, the magnetic measurement information can be merged 914 and used to generate a geomagnetic map patch 916 having a resolution that is greater than the resolution of a baseline dataset of geomagnetic information. The geomagnetic map patch can then be transmitted 918 and used to update a global geomagnetic map 920. In particular embodiments, the method illustrated in FIG. 9 can be used for any number of regional servers.

Figure 10:
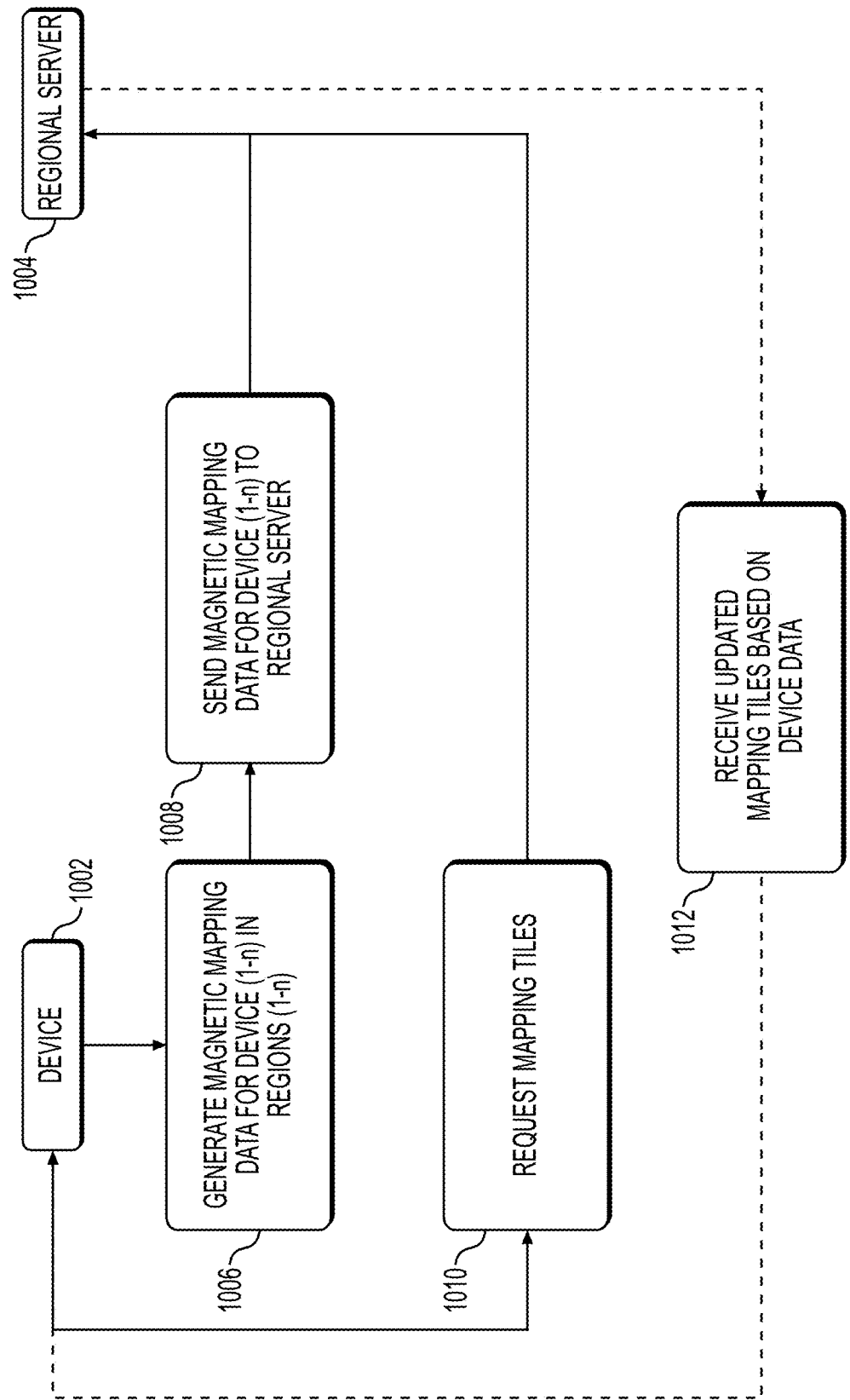
FIG. 10 illustrates an example process for communicating with an example magnetic navigation system.

In particular embodiments, magnetic navigation devices can generate, send and receive magnetic measurement information that can be formatted in one of a number of different data formats. FIG. 10 illustrates various processes performed within a magnetic navigation system in which a magnetic navigation device 1002 can communicate with a regional server 1004. In particular embodiments the magnetic navigation device 1002 can generate magnetic measurement information 1006 based on the region in which it is located and the applicable hardware that it has on board to generate such data. Subsequently, that magnetic measurement information can be transmitted 1008 to the regional server 1004 via a wireless connection. As can be seen in FIGS. 1A-1B and 12-13, wireless connections between magnetic navigation devices and server systems within a magnetic navigation system can involve wireless communication such as (but not limited to) communication via a cellular data network, satellite communication link, wireless access point, or other wireless communication channel. Magnetic navigation devices can also request geomagnetic map data 1010 (e.g. geomagnetic map tiles) for a given geographical region in which the device is located. The regional server 1004 can, based on the request, transmit the current geomagnetic map data 1012 for the region to the magnetic navigation device. As noted above, the geomagnetic data can be provided in combination with UI map tiles. In particular embodiments, UI map tiles can be obtained from other servers.

Figure 11:
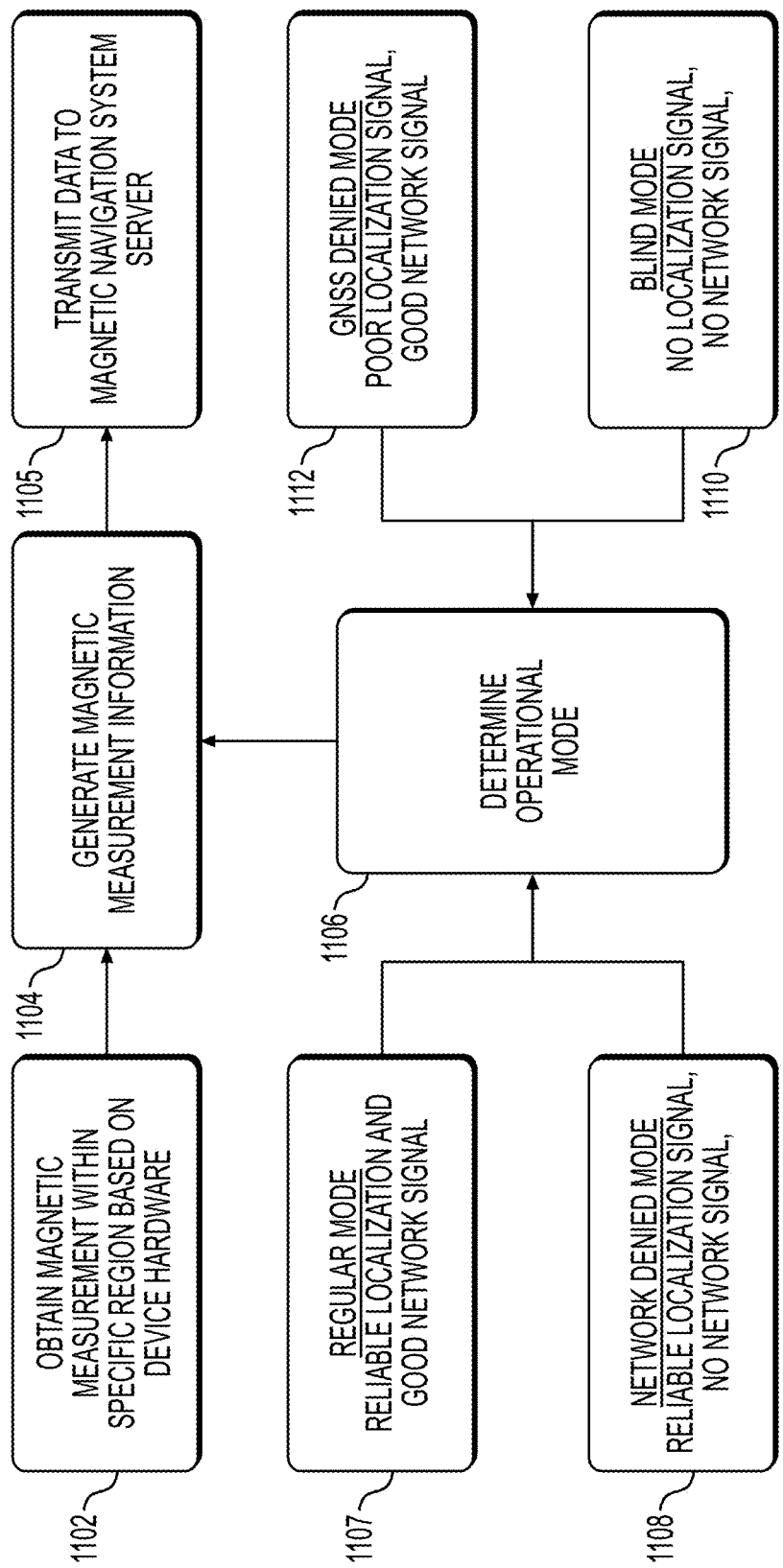
FIG. 11 illustrates an example process for transmitting example magnetic measurement information to an example magnetic navigation system based on available localization information or network connectivity.

The manner in which magnetic measurements can be made by magnetic measurement devices can be dependent upon the availability of other sources of localization information or the available network connectivity. Various magnetic measurement modes that can be employed by a magnetic navigation device in particular embodiments are illustrated in FIG. 11. Magnetic measurements can be obtained (1102) using magnetometers within a magnetic navigation device. The magnetic measurements can be utilized to generate (1104) magnetic measurement information that is transmitted (1105) to a server within the magnetic navigation system (e.g. a regional server). The specific magnetic measurement information provided can depend upon the availability of additional sources of localization information. For example, based on the available information, an operational mode may be selected or determined 1106, such as a normal mode 1107, network-denied mode 1108, blind mode 1110, or GNSS-denied mode 1112. When reliable localization information is available and the magnetic navigation device has access to a wireless data network, the magnetic navigation device can operate in a normal or regular mode 1107 of operation in which magnetic measurements are gathered and a combination of magnetic measurements and position information are transmitted (1105) to the magnetic navigation system as the data are acquired. However, if the device does not have adequate network signal 1108, the data can be gathered and stored locally for transmission once network connectivity is established in a network-denied mode 1108. Similarly, the device can operate in a GNSS-denied 1112 mode, where the device has an inadequate GNSS signal 1110. In some embodiments, the device can utilize INS to gather rough data when reliable GNSS signal is not available. Subsequently, as GNSS signals become available the magnetic navigation device can initiate a transition between gathering modes or update localization estimates determined using INS or other sources of localization information. In particular embodiments, the device may use INS in conjunction with good network signal, to gather and transmit data to a regional server. In those embodiments that lack network signal, data can be transferred to the regional server once adequate signal become available.

Figure 12:
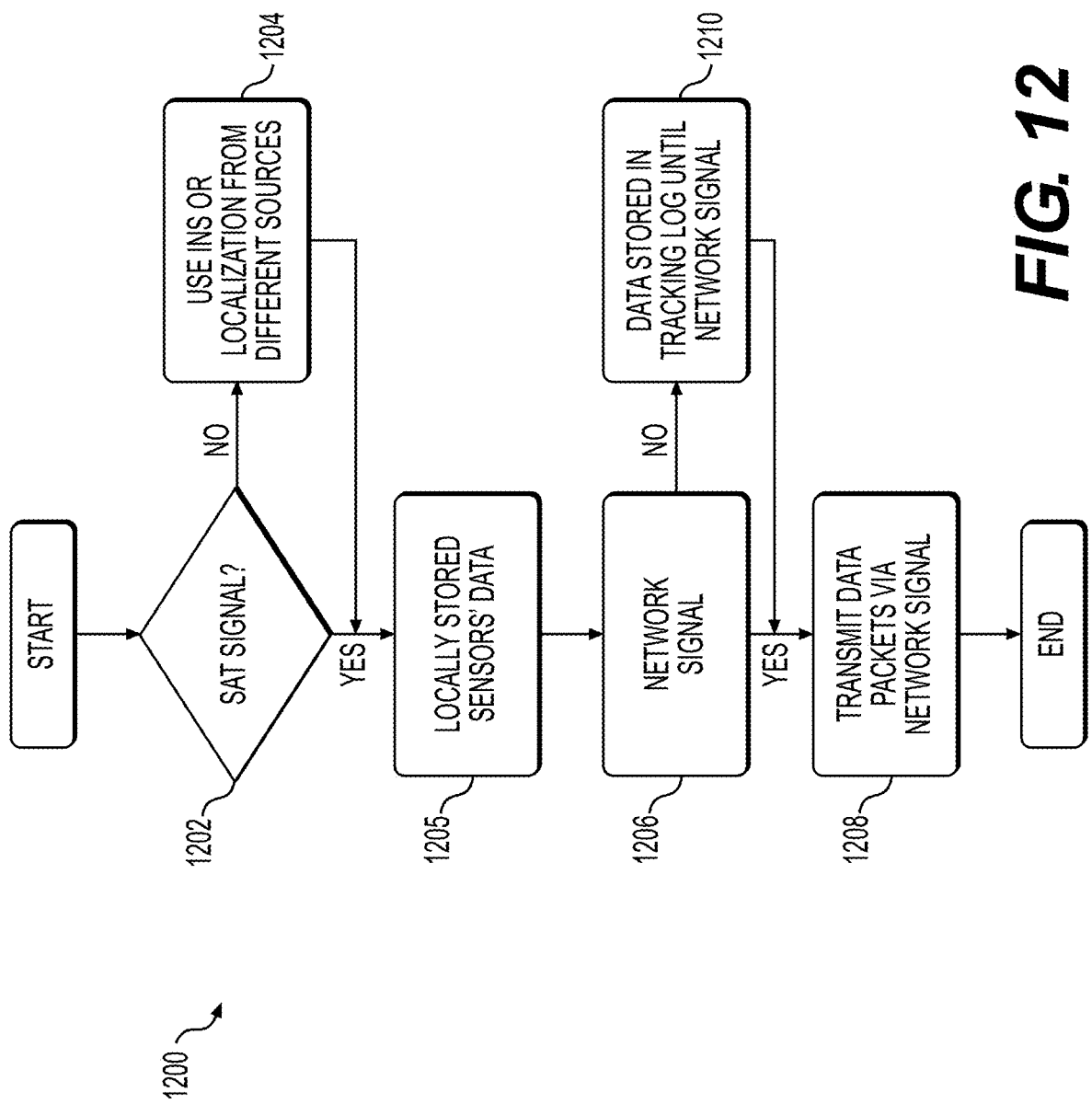
FIG. 12 illustrates an example method for transmitting example magnetic measurement information to an example magnetic navigation system.
Figure 14B:
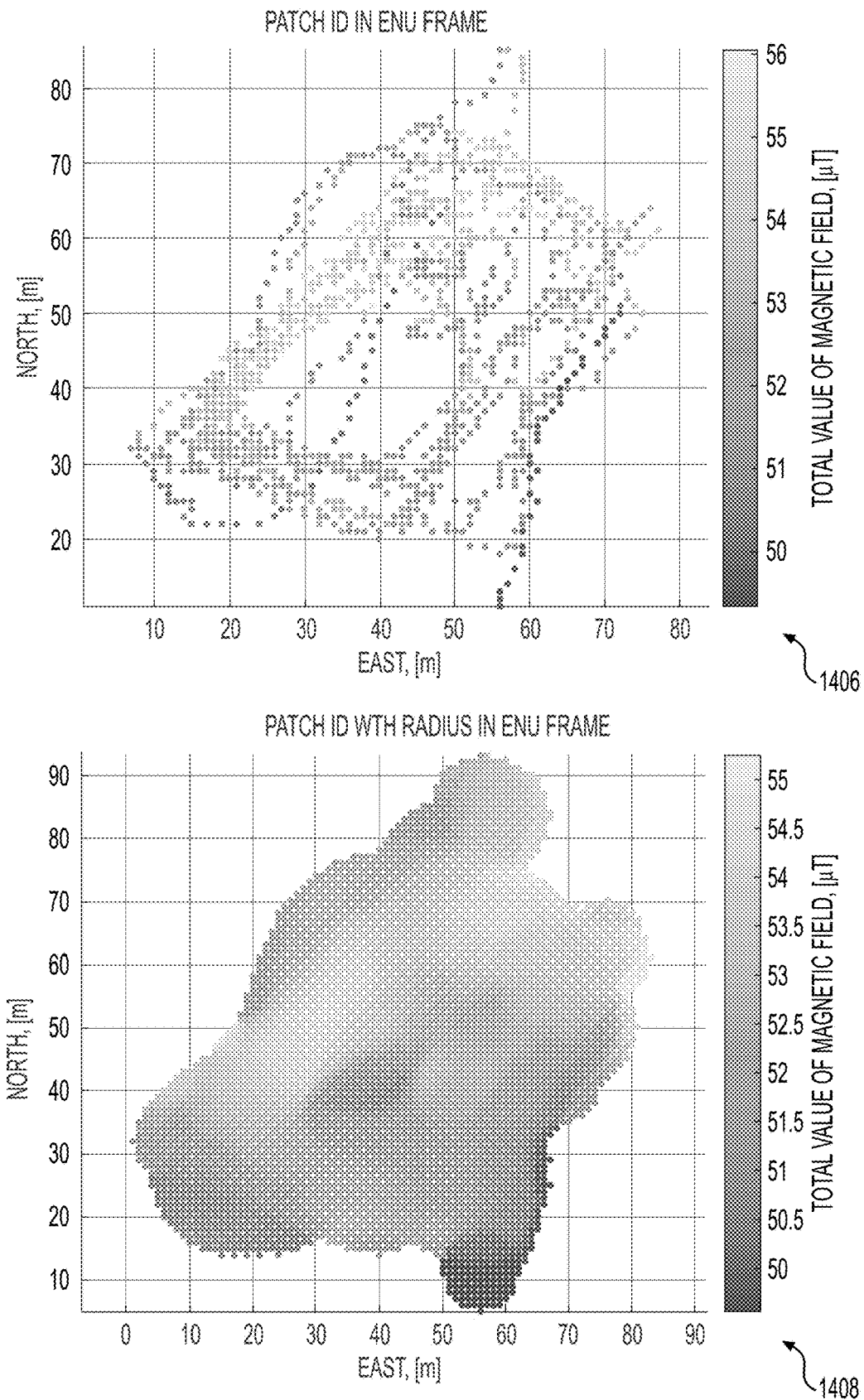
Figure 14C:
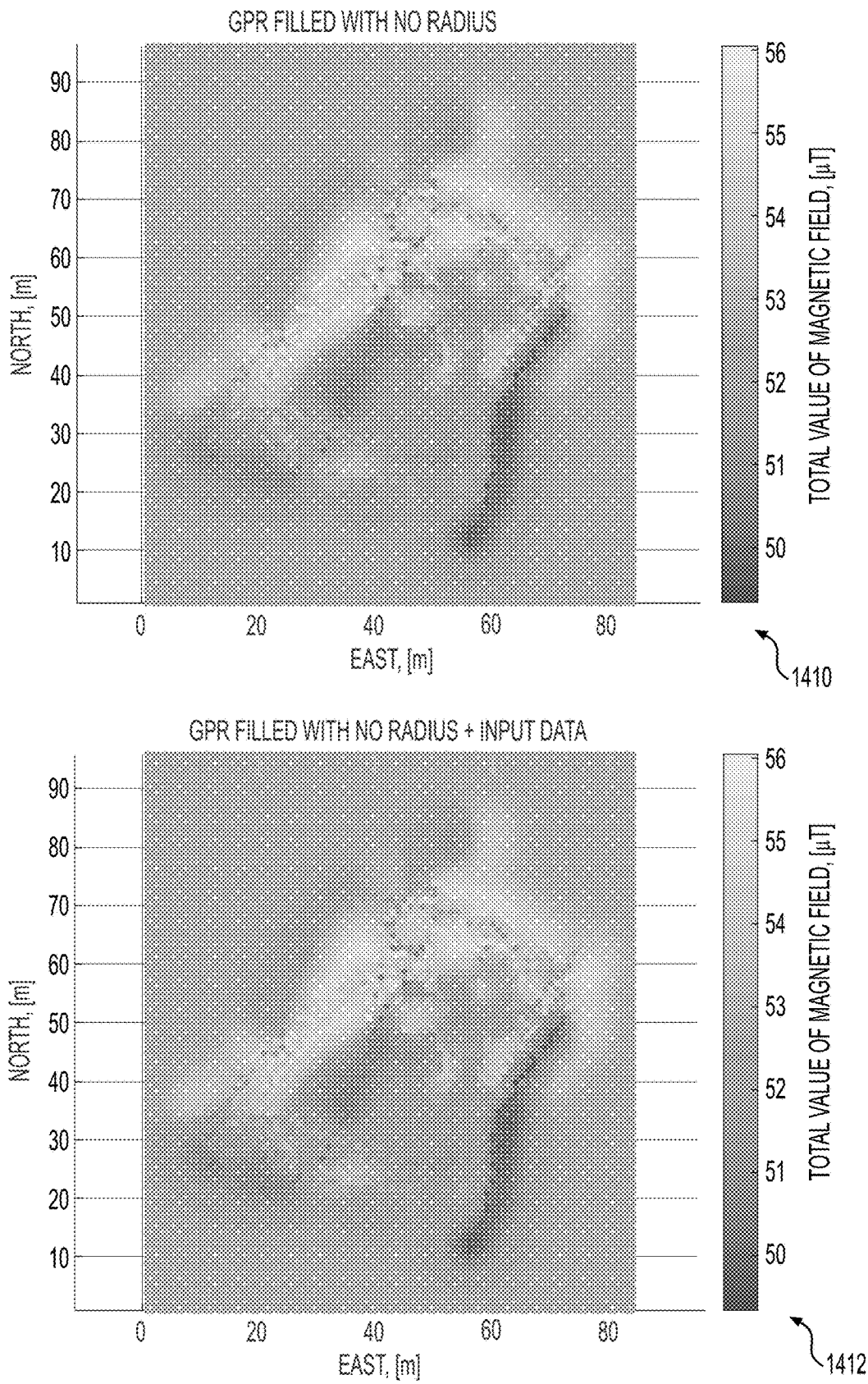
Figure 14D:
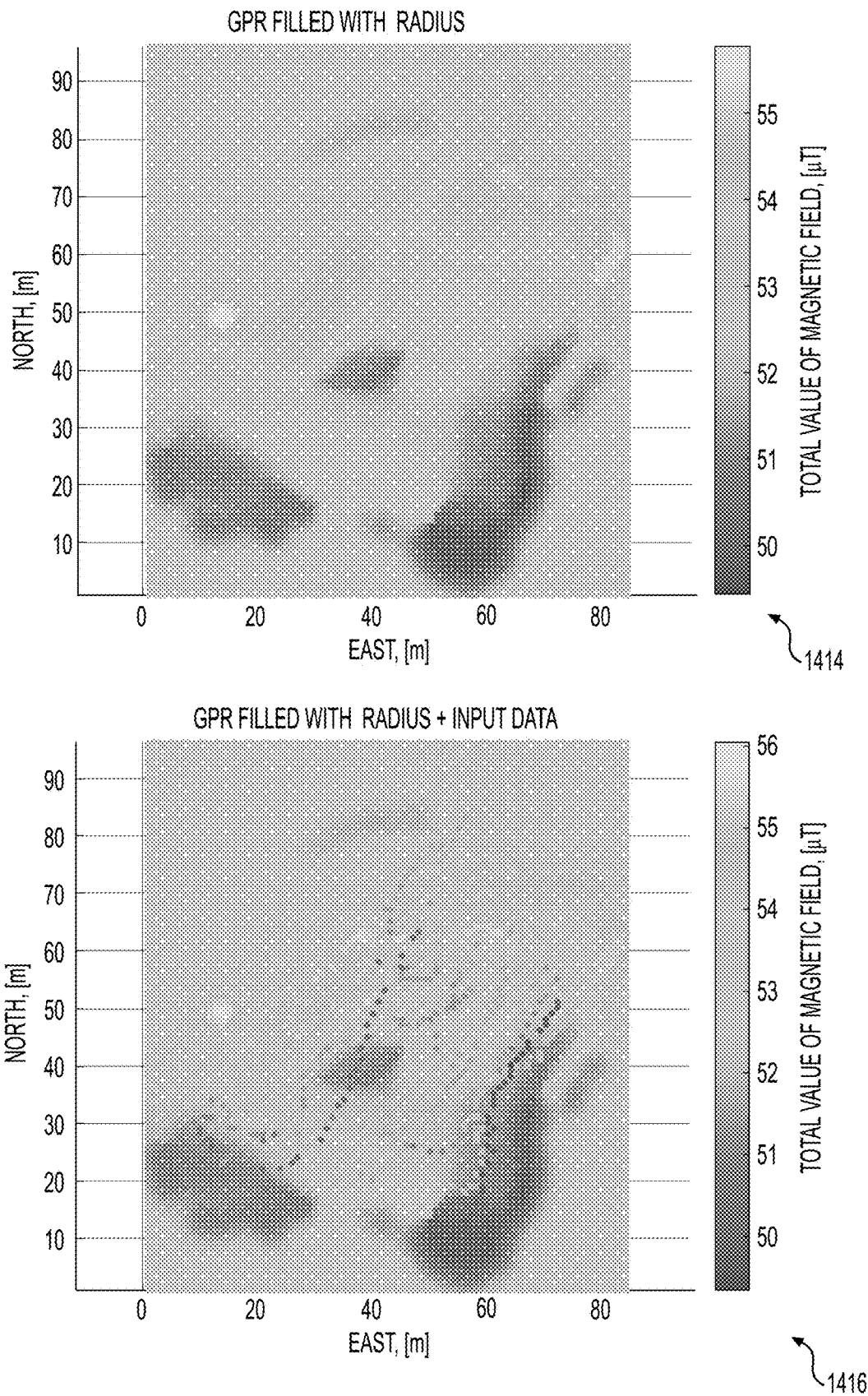

FIG. 12 illustrates a decision-making process 1200 implemented within a magnetic navigation device to determine how to gather and transmit magnetic measurement information based upon GNSS or communication network availability. The magnetic navigation device can determine whether there is an adequate GNSS signal 1202. If not, the magnetic navigation device can then utilize INS localization and dead reckoning to generate localization data 1204. The INS localization data can then be stored locally on the device 1205 for transmission when sufficient network signal is obtained. Subsequently, the system or device can determine if there is network signal 1206 sufficient to transmit magnetic measurement information including the localization data. If there is, then the data can be transmitted 1208 to the magnetic navigation system servers. If not, then the magnetic measurement information can be stored 1210 until a network signal is available.

While specific processes are described above for generating magnetic measurement information using different sources of localization information, magnetic navigation devices can utilize any of a variety of processes or sources for magnetic or localization information in the generation of magnetic measurement information as appropriate to the requirements of specific applications in particular embodiments.

As noted above, geomagnetic maps can be utilized in any number of applications to navigate, including land, air, and water. Magnetic navigation devices can utilize geomagnetic maps or additional information regarding the field of magnetic susceptibility and electric conductivity of environmental materials to perform magnetic navigation. The specific manner in which a magnetic navigation device navigates can be dependent upon the availability of other sources of localization information or network connectivity. When available, magnetic navigation devices can utilize a GNSS to provide localization information that can be refined in combination with magnetic measurements or INS measurements. When unavailable, the magnetic navigation device can rely upon prior GNSS localization information in combination with INS measurements and magnetic measurements. As noted above, the magnetic navigation device utilizes magnetic measurements to provide localization information based upon geomagnetic map information. The magnetic navigation device can store geomagnetic map information. However, magnetic navigation systems in particular embodiments periodically update geomagnetic map information. Accordingly, magnetic navigation devices in particular embodiments can attempt to retrieve updated geomagnetic map information in order to perform localization or navigation based upon magnetic measurements. As noted above, GNSS information may be unreliable or unavailable in certain regions due to the surrounding environment (e.g. tall buildings, canyons, etc.). In particular embodiments, the geomagnetic map can include information about the reliability of GNSS localization information in specific locations to enable magnetic navigation devices to better reconcile discrepancies between locations determined based upon GNSS information and the likelihood of that location being correct based upon magnetic field measurements. Magnetic field measurements can be utilized in any of a variety of different ways to perform localization in combination with additional sources of localization information as appropriate to the requirements of specific applications in particular embodiments.

As previously noted with respect to generating mapping data, particular embodiments may incorporate similar navigation operational modes. For example, if the navigation device has a reliable GNSS connection and a reliable cellular network connection it may operate in a normal transmission mode (e.g. regular mode 1107) by receiving updated magnetic mapping tiles or cubes for the given region of operation. Additionally, as magnetic mapping tiles or cubes are transmitted to the navigation device, the device can compare magnetic mapping tile/cube data with that of traditional GNSS data and evaluate the comparison for any discrepancies that can be transmitted to a regional server for later processing. Alternatively, if the device has an inadequate GNSS connection but a sufficient network connection (e.g. GNSS-denied mode 1112), many embodiments may rely primarily on geomagnetic map information, including mapping tiles or cubes supplied from the regional server for navigational purposes. Particular embodiments may also incorporate the use of dead reckoning and INS to augment the magnetic mapping data for reliable navigation.

In contrast, some situations may not allow for complete use of GNSS or network connections to navigate using magnetic mapping data. Various embodiments may allow for continued navigation even with inadequate cellular network signal from which to pull updated magnetic mapping data. For example, if only GNSS connection is available without a reliable cellular network connection (e.g. network-denied mode 1108), some embodiments may continue to operate utilizing previously transmitted magnetic mapping data augmented with the current GNSS data. Additionally, INS can be used to generate additional data for dead reckoning. Accordingly, INS, GNSS, and previously downloaded magnetic mapping data can be compared for irregularities that can be transmitted, at a later time, to the regional server for use in further improvement of overall magnetic mapping data. Likewise, when some navigation devices are effectively operating in a blind mode 1110, without reliable GNSS or cellular network connections, INS and previously downloaded magnetic mapping data can be used for navigational purposes. The INS and magnetic data, organic to the navigational device, can likewise be used for later transmission to the regional servers for use in improving the overall magnetic map for the given region.

FIG. 13 illustrates an example method for navigating based on available localization and network connectivity. In method 1300, the magnetic navigation device can determine 1302 that an adequate GNSS signal is available and proceed with obtaining localization information and requesting any available updated geomagnetic map information. When the GNSS signal is unavailable, the magnetic navigation device can use 1304 measurements made by an IMU or other sources of localization information to estimate position in combination with magnetic measurements.

When the magnetic navigation device attempts to retrieve updated geomagnetic information, the magnetic navigation device can determine 1306 whether a network connection is available. When a network connection is available, the magnetic navigation device can request and (when available) obtain updated geomagnetic map information. In particular embodiments, the geomagnetic map information for a particular region is provided in the form of geomagnetic map tiles 1308. Geomagnetic map information can be provided in any of a variety of formats as appropriate to the requirements of specific applications in particular embodiments. When a network connection is unavailable, localization or navigation can proceed 1310 using pre-cached geomagnetic map information (e.g. geomagnetic map tiles). In various embodiments, magnetic measurements can be processed using the geomagnetic map information to perform localization and compared to the position estimate generated using any combination of GNSS, INS, or other sources of localization data. The comparison can be evaluated for discrepancies and then further refined. In particular embodiments, geomagnetic map information can include indications of regions in which GNSS signals are unreliable and likely to produce incorrect position estimates. Accordingly, the geomagnetic map information can assist with resolving discrepancies. The magnetic navigation device can also use such information to process INS data to perform dead reckoning based upon previous reliable GNSS information (potentially ignoring more recent, but less reliable GNSS information).

If there is not sufficient network connectivity to obtain geomagnetic map information, the magnetic navigation device can perform localization or mapping in a conventional manner using GNSS information. However, the magnetic navigation device can continue to make magnetic measurements and can provide magnetic measurement information based upon these measurements and localization information derived from sources including the GNSS information to the magnetic navigation system for the purposes of updating a global geomagnetic map. In some embodiments, geomagnetic map information can be later downloaded and the information utilized to determine localization information in combination with GNSS data to determine the most accurate position information to utilized within the magnetic measurement information provided to the magnetic navigation system by the magnetic navigation device.

In particular embodiments, navigation techniques, as described above, can be performed regardless of the location of the device within the region. For example, in traditional GNSS systems, local anomalies can act as blockers for signals to the device. However, since many embodiments factor in the magnetic susceptibility and conductivity of the local anomalies, and the system is based on stable magnetic mapping data, many embodiments can function in and around the local anomalies. This holds true for interior navigation of buildings. In some embodiments, the system can provide navigational tools for accurately navigating within buildings as well as around them. Additionally, the landscape of the buildings can be more accurately mapped the more the system is used in and around the local anomalies.

In particular embodiments, navigation techniques, similar to those described above can be augmented by using isolines for navigation over rough mapping data. Isolines can be referred to as lines of equal values of a magnetic field or its gradients on a map. In particular embodiments, the navigation techniques can use isolines to control an object by utilizing errors of deviation values from the isoline or a set of isolines (similar to controlling of an aircraft by line-of-position from radio beacon) in relation to the navigation device.

Magnetic mapping data can be used for a variety of systems and methods in particular embodiments described herein. For example, some embodiments may be designed for use in a search and rescue or emergency response type mission that would allow searchers to capitalize on the magnetic mapping data from their own device as well as that from those in need to triangulate positioning and mapping the best course of action for executing the rescue. Other embodiments could be used to augment existing navigational applications to help improve the navigation through tunnels or underground passages. For example, mining operations can benefit from improved magnetic mapping systems for improving the safety of the workers through reliable localization. Additionally, many embodiments can be used for improved navigation and localizing devices within buildings. For example, systems and methods described herein can be used to aid device users in navigating buildings such as apartment complexes, businesses, or industrial localization. In some embodiments the system can build magnetic maps and magnetic mapping data for such localization using Gaussian Process Regression (GPR) which can eliminate the need for precise floor measurements in such close quarters localization. FIGS. 14A-14D illustrate example magnetic data for improved localization, showing overlaying input and predicted data sets that can generate an extrapolated magnetic map for localization. In particular, charts 1402-1416 depicted in FIGS. 14A-14D illustrate visualization of magnetic field, where different intensities of magnetic field are represented by different colors. The X and Y axis in these charts are reference directions of some coordinate system (e.g., ENU coordinate system) in metric units. In the first chart 1402, input data are magnetic values measured along the random trajectories with the known localization in XY axis. As can be seen by the first chart 1402, only ⅙ of area covered by measurements. Chart 1404 shows the same trajectories for latitude-longitude axes. Charts 1406-1416 represent the process of filling the map patch with magnetic field providing the different combination of interpolation between empty areas. In particular, chart 1408 represents visualization of magnetic field with radius of reliable localization, without interpolation; chart 1410 shows the filling of the whole patch based on GPR, without radius; chart 1412 represents visualization of magnetic filled both from GPR interpolation and from real input data; chart 1414 shows the filling of the whole patch based on GPR, with taking into account of radius of reliable localization; and finally chart 1416 represents visualization of magnetic filled both from GPR interpolation and from real input data, taking into account radius of reliable localization. Similar embodiments can be incorporated into use with autonomous robots or drones, which can be used in a number of different circumstances.

Figure 15:
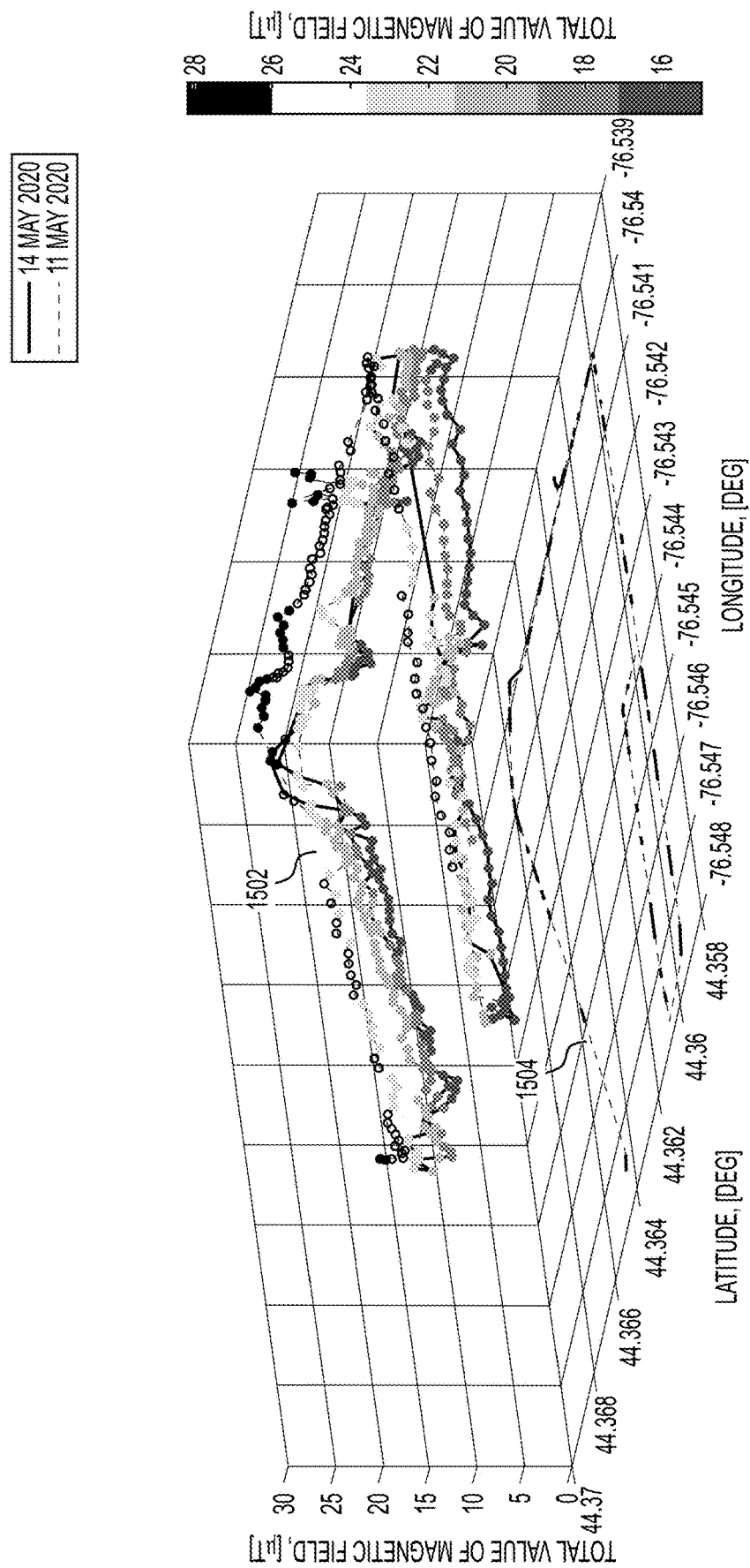
FIG. 15 illustrates example repetitive reliable magnetic mapping data gathered on an example course over multiple days.

Other embodiments of the magnetic mapping or navigation systems can be used in numerous outdoor environments including, but not limited to, GNSS deprived environments. For example, various embodiments may incorporate a trace back function. Such functions can be useful for robotic or remote-controlled devices that are navigating to a specific location. In the event that the device loses line of sight with the control unit, it could utilize stored or previously used magnetic mapping data to retrace a path back to the control unit without the need for line of sight or a reliable GNSS or network connection. Likewise, many such embodiments can be used in a variety of applications in which there is limited GNSS or network connectivity. For example, as mentioned above, embodiments can be used to augment other mapping applications to allow for reliable localization in remote locations or other locations with poor connectivity. For example, FIG. 15 illustrates a set of magnetic mapping data 1502 for a given device along a predetermined trajectory 1504 on a first day (e.g. 11 May 2020) and a second day (e.g. 14 May 2020). Specifically, FIG. 15 demonstrates that the magnetic measurements made on different days or times are repeatable for navigation and mapping purposes. Saved data can be used and reused in particular embodiments to allow for continued and reliable localization when connectivity can be interrupted.

Other embodiments can be incorporated at a smaller scale for a variety of different uses. For example, an individual may define a given area as the "desired region" of operation. The desired region of operation can be established with geomagnetic fencing elements such that a known device can be "fenced" in or kept out of a desired region. Some examples include dog collars that can be used on a particular parcel of land or within a particular region of a city. In some embodiments, the dog collar or localization device can be designed to prevent movement beyond a defined area or prevent function beyond said area. Other examples may include a secure area in which cellular devices, as an example, may pose an undue risk. Additionally, that alerts can be used to notify other devices of movement within, close to, and beyond the desired region.

Many systems and methods described herein can also be useful in areas that experience high levels of interference with various anomalies or diminished connectivity. For example, many marine type vehicles, especially submersibles, may need more reliable localization systems. Accordingly, magnetic mapping and navigation systems, particular embodiments, can be used in submersibles such as military or science exploration vehicles. Additionally, many such devices may utilize secondary equipment that operate such as remotely operated devices or projectiles that likewise may require reliable localization for guidance. Accordingly, particular embodiments can be adapted for use in such devices as primary localization or an augmented localization system.

Many other applications can be appreciated given the reliability of embodiments of the magnetic mapping and localization systems described here. For example, because many embodiments can operate without adequate GNSS or network connections, some systems may be adapted for a leader/follower configuration. The leader may be a device that passes through a particular region that may have poor connectivity (dead zone). During the movement, the leader device generates magnetic mapping data that can be used for generating trajectories and rough mapping data. Such data can then be transmitted to a follower device prior to entering the dead zone and then utilize the data from the leader device to successfully navigate the dead zone. Additionally, each follower device can generate follower data to be transmitted that can be used to improve the magnetic mapping tiles that can be transmitted to other follower devices.

Moreover, as discussed previously with respect to extrapolating various two dimensional data sets to generate a three dimensional data set, some systems can be adapted for use in a ground—air localization technique. For example, a ground based device can be used to generate magnetic mapping data that can subsequently be extrapolated upwards to generate three dimensional mapping cubes. The three dimensional mapping cubes would then contain altitude data that could be used by an air based device for air localization/navigation through a particular region.

The concepts herein can be implemented in a variety of arrangements in particular. For example, a navigation system and methods for using such where a continuously updated magnetic mapping system compares individual regional device profiles to generate new mapping tiles. Achieving such functionality, according to embodiments, involves the implementation of special arrangements or designs between subsystems described above, and their equivalents.

Figure 16:
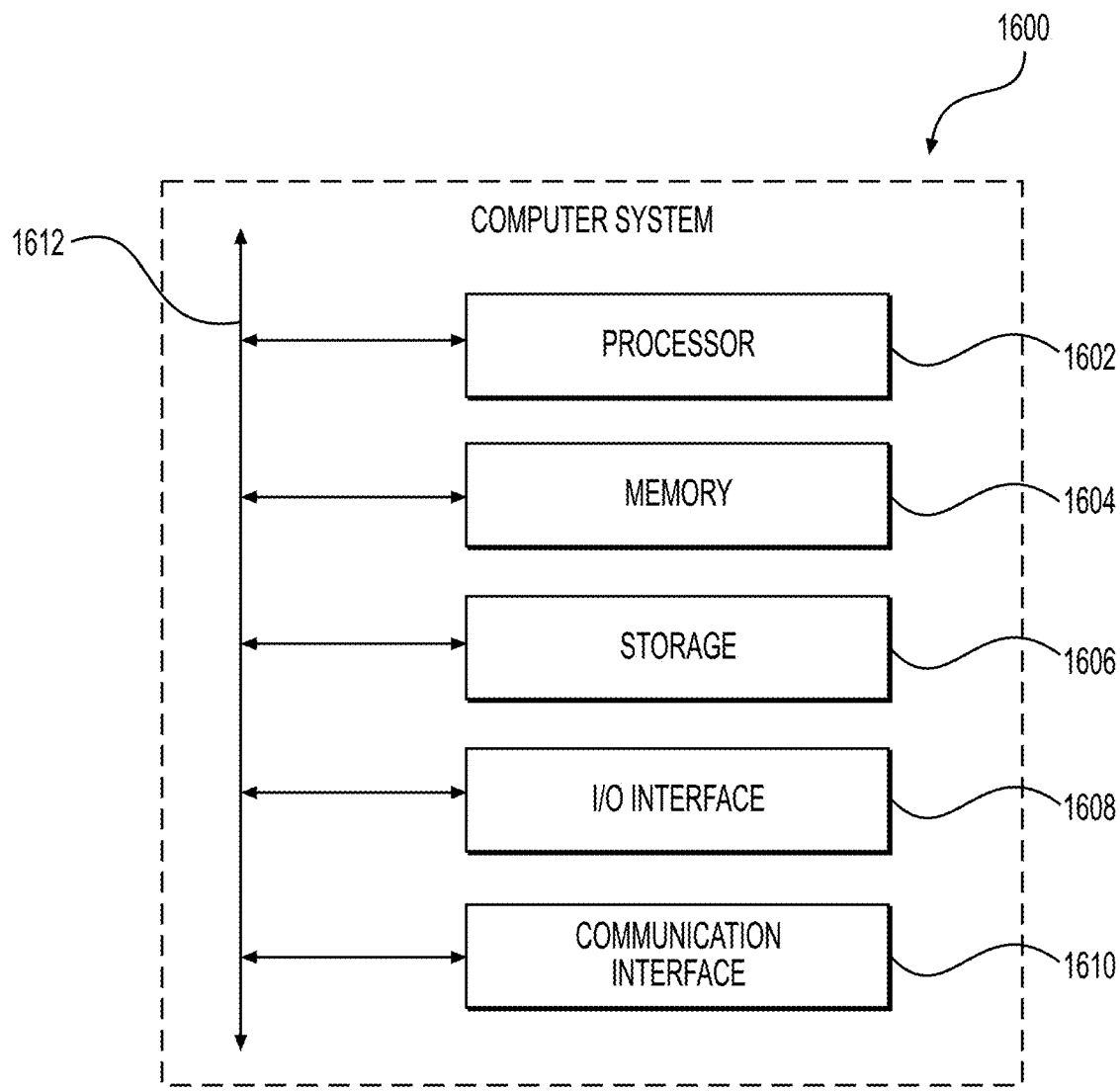
FIG. 16 illustrates an example computer system.

FIG. 16 illustrates an example computer system 1600. In particular embodiments, one or more computer systems 1600 perform one or more steps of one or more methods described or illustrated herein. In particular embodiments, computer system 1600 may be a computing system or device associated with a magnetic navigation device 110, a regional data server 112, or a main mapping server 116. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606.

Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, the scope of this disclosure encompasses all advantages of the example embodiments described or illustrated herein that a person having ordinary skill in the art would comprehend. The scope of this disclosure is not limited to the particular advantages specifically described or illustrated herein.

What is claimed is:

1. A method for incorporating one or more regional magnetic data sets into a master geomagnetic map, wherein the method comprises:

by a mapping server, receiving from a plurality of regional servers a plurality of regional magnetic data sets, wherein:
   each of the regional servers corresponds to one of a plurality of geographic regions;

a first one of the regional magnetic data sets were generated by a first one of the regional servers corresponding to a first one of the geographical regions; and the plurality of magnetic measurements were received at the first one of the regional servers from one or more first magnetic-measurement devices within the first one of the geographical regions;

by the mapping server, incorporating into a master geomagnetic map one or more of the regional magnetic data sets, wherein the master geomagnetic map comprises one or more of the geographic regions; and by the mapping server, communicating one or more portions of the master geomagnetic map with one or more of the incorporated regional magnetic data sets to one or more of the regional servers for distribution as geomagnetic map information to one or more second magnetic-measurement devices for localization or navigation.

2. The method of claim 1, wherein each of one or more of the first or second magnetic-measurement devices is a mobile phone, an automotive navigation system, a marine navigation system, an aerial navigation system, a drone, a robot, or a forklift.

3. The method of claim 1, wherein each of one or more of the first or second magnetic-measurement devices comprises:
a processing system;
a magnetic sensor system; and
a memory operable to store geomagnetic map information.

4. The method of claim 1, wherein each of one or more of the second magnetic-measurement devices is operable to perform navigation or localization using geomagnetic map information without a global navigation satellite system (GNSS) signal.

5. The method of claim 1, wherein each of one or more of the second magnetic-measurement devices is operable to perform navigation or localization using one or more of a global navigation satellite system (GNSS) signal, inertial navigation system (INS) measurements, or the geomagnetic map data.

6. The method of claim 1, wherein each of one or more of the second magnetic-measurement devices is operable to determine an operational mode for navigation or localization based on a global navigation satellite system (GNSS)-signal strength and network-connection strength at the second magnetic-measurement device.

7. The method of claim 6, wherein the operational mode is one of a regular mode, GNSS denied mode, network denied mode, or blind mode.

8. The method of claim 1, wherein the first one of the regional magnetic data sets were generated based on a weighting of one or more the magnetic measurements according to one or more trust coefficients assigned to one or more of the first magnetic-measurement devices.

9. The method of claim 1, wherein the first one of the regional magnetic data sets were generated in part by a similarity correlation analysis on the magnetic measurements, wherein the magnetic measurements were collected over a period of time.

10. The method of claim 1, wherein each of one or more of the magnetic measurements from one of the first magnetic-measurement devices comprises:
an identifier of the magnetic navigation device;
an indicator of a device type of the one of the magnetic navigation devices;
a trajectory indicating one or more geomagnetic readings by the one of magnetic navigation device; and
a time stamp indicating a starting time of the trajectory.

11. One or more computer-readable non-transitory storage media embodying software for incorporating one or more regional magnetic data sets into a master geomagnetic map, wherein the software is operable when executed to:
by a mapping server, receiving from a plurality of regional servers a plurality of regional magnetic data sets, wherein:
each of the regional servers corresponds to one of a plurality of geographic regions;
a first one of the regional magnetic data sets were generated by a first one of the regional servers corresponding to a first one of the geographical regions; and
the plurality of magnetic measurements were received at the first one of the regional servers from one or more first magnetic-measurement devices within the first one of the geographical regions;
by the mapping server, incorporating into a master geomagnetic map one or more of the regional magnetic data sets, wherein the master geomagnetic map comprises one or more of the geographic regions; and
by the mapping server, communicating one or more portions of the master geomagnetic map with one or more of the incorporated regional magnetic data sets to one or more of the regional servers for distribution as geomagnetic map information to one or more second magnetic-measurement devices for localization or navigation.

12. The media of claim 11, wherein each of one or more of the first or second magnetic-measurement devices is a mobile phone, an automotive navigation system, a marine navigation system, an aerial navigation system, a drone, a robot, or a forklift.

13. The media of claim 11, wherein each of one or more of the first or second magnetic-measurement devices comprises:
a processing system;
a magnetic sensor system; and
a memory operable to store geomagnetic map information.

14. The media of claim 11, wherein each of one or more of the second magnetic-measurement devices is operable to perform navigation or localization using geomagnetic map information without a global navigation satellite system (GNSS) signal.

15. The media of claim 11, wherein each of one or more of the second magnetic-measurement devices is operable to perform navigation or localization using one or more of a global navigation satellite system (GNSS) signal, inertial navigation system (INS) measurements, or the geomagnetic map data.

16. The media of claim 11, wherein each of one or more of the second magnetic-measurement devices is operable to determine an operational mode for navigation or localization based on a global navigation satellite system (GNSS)-signal strength and network-connection strength at the second magnetic-measurement device.

17. The media of claim 16, wherein the operational mode is one of a regular mode, GNSS denied mode, network denied mode, or blind mode.

18. The media of claim 11, wherein the first one of the regional magnetic data sets were generated based on a weighting of one or more the magnetic measurements according to one or more trust coefficients assigned to one or more of the first magnetic-measurement devices.

19. The media of claim 11, wherein the first one of the regional magnetic data sets were generated in part by a similarity correlation analysis on the magnetic measurements, wherein the magnetic measurements were collected over a period of time.

20. The media of claim 11, wherein each of one or more of the magnetic measurements from one of the first magnetic-measurement devices comprises:
   an identifier of the magnetic navigation device;
   an indicator of a device type of the one of the magnetic navigation devices;
   a trajectory indicating one or more geomagnetic readings by the one of magnetic navigation device; and
   a time stamp indicating a starting time of the trajectory.

21. An apparatus for incorporating one or more regional magnetic data sets into a master geomagnetic map, wherein the apparatus comprises:
   one or more processors; and
   one or more computer-readable non-transitory storage media coupled to the processors that embodies software that is operable when executed by the processors to:
      by a mapping server, receiving from a plurality of regional servers a plurality of regional magnetic data sets, wherein:
         each of the regional servers corresponds to one of a plurality of geographic regions;
         a first one of the regional magnetic data sets were generated by a first one of the regional servers corresponding to a first one of the geographical regions; and
         the plurality of magnetic measurements were received at the first one of the regional servers from one or more first magnetic-measurement devices within the first one of the geographical regions;
      by the mapping server, incorporating into a master geomagnetic map one or more of the regional magnetic data sets, wherein the master geomagnetic map comprises one or more of the geographic regions; and
      by the mapping server, communicating one or more portions of the master geomagnetic map with one or more of the incorporated regional magnetic data sets to one or more of the regional servers for distribution as geomagnetic map information to one or more second magnetic-measurement devices for localization or navigation.

22. The apparatus of claim 21, wherein each of one or more of the first or second magnetic-measurement devices is a mobile phone, an automotive navigation system, a marine navigation system, an aerial navigation system, a drone, a robot, or a forklift.

23. The apparatus of claim 21, wherein each of one or more of the first or second magnetic-measurement devices comprises:
   a processing system;
   a magnetic sensor system; and
   a memory operable to store geomagnetic map information.

24. The apparatus of claim 21, wherein each of one or more of the second magnetic-measurement devices is operable to perform navigation or localization using geomagnetic map information without a global navigation satellite system (GNSS) signal.

25. The apparatus of claim 21, wherein each of one or more of the second magnetic-measurement devices is operable to perform navigation or localization using one or more of a global navigation satellite system (GNSS) signal, inertial navigation system (INS) measurements, or the geomagnetic map data.

26. The apparatus of claim 21, wherein each of one or more of the second magnetic-measurement devices is operable to determine an operational mode for navigation or localization based on a global navigation satellite system (GNSS)-signal strength and network-connection strength at the second magnetic-measurement device.

27. The apparatus of claim 26, wherein the operational mode is one of a regular mode, GNSS denied mode, network denied mode, or blind mode.

28. The apparatus of claim 21, wherein the first one of the regional magnetic data sets were generated based on a weighting of one or more the magnetic measurements according to one or more trust coefficients assigned to one or more of the first magnetic-measurement devices.

29. The apparatus of claim 21, wherein the first one of the regional magnetic data sets were generated in part by a similarity correlation analysis on the magnetic measurements, wherein the magnetic measurements were collected over a period of time.

30. The apparatus of claim 21, wherein each of one or more of the magnetic measurements from one of the first magnetic-measurement devices comprises:
   an identifier of the magnetic navigation device;
   an indicator of a device type of the one of the magnetic navigation devices;
   a trajectory indicating one or more geomagnetic readings by the one of magnetic navigation device; and
   a time stamp indicating a starting time of the trajectory.

31. A system for incorporating one or more regional magnetic data sets into a master geomagnetic map, wherein the system comprises:
   means for receiving from a plurality of regional servers a plurality of regional magnetic data sets, wherein:
      each of the regional servers corresponds to one of a plurality of geographic regions;
      a first one of the regional magnetic data sets were generated by a first one of the regional servers corresponding to a first one of the geographical regions; and
      the plurality of magnetic measurements were received at the first one of the regional servers from one or more first magnetic-measurement devices within the first one of the geographical regions;
   means for incorporating into a master geomagnetic map one or more of the regional magnetic data sets, wherein the master geomagnetic map comprises one or more of the geographic regions; and
   means for communicating one or more portions of the master geomagnetic map with one or more of the incorporated regional magnetic data sets to one or more of the regional servers for distribution as geomagnetic map information to one or more second magnetic-measurement devices for localization or navigation.

32. The method of claim 1, wherein incorporating into the master geomagnetic map one or more of the regional magnetic data sets comprises creating one or more portions of the master geomagnetic map.

33. The method of claim 1, wherein incorporating into the master geomagnetic map one or more of the regional magnetic data sets comprises updating one or more portions of the master geomagnetic map.

34. The method of claim 33, wherein one or more of the portions of the master geomagnetic map comprise one or more portions of an Earth Magnetic Anomaly Grid with 2-arc-minute resolution (EMAG2) model.

35. The method of claim 1, wherein each of one or more of the second magnetic- measurement devices is one of the first magnetic-measurement devices.

36. The method of claim 1, wherein the mapping server is colocated at least in part with one or more of the regional servers and one or more of the first or second magnetic-measurement devices.

37. The method of claim 3, wherein each of one or more of the first or second magnetic-measurement devices further comprises:
a global navigation satellite system (GNSS) receiver;
an inertial navigation system (INS); and
a wireless module.

38. The method of claim 1, wherein the first one of the regional magnetic data sets were generated based on one or more of the following:
a plurality of magnetic measurements made within the first one of the geographical regions; or
a plurality of magnetic measurements made outside the first one of the geographical regions.

39. The media of claim 11, wherein incorporating into the master geomagnetic map one or more of the regional magnetic data sets comprises creating one or more portions of the master geomagnetic map.

40. The media of claim 11, wherein incorporating into the master geomagnetic map one or more of the regional magnetic data sets comprises updating one or more portions of the master geomagnetic map.

41. The media of claim 40, wherein one or more of the portions of the master geomagnetic map comprise one or more portions of an Earth Magnetic Anomaly Grid with 2-arc-minute resolution (EMAG2) model.

42. The media of claim 11, wherein each of one or more of the second magnetic-measurement devices is one of the first magnetic-measurement devices.

43. The media of claim 11, wherein the mapping server is colocated at least in part with one or more of the regional servers and one or more of the first or second magnetic-measurement devices.

44. The media of claim 13, wherein each of one or more of the first or second magnetic-measurement devices further comprises:
a global navigation satellite system (GNSS) receiver;
an inertial navigation system (INS); and
a wireless module.

45. The media of claim 11, wherein the first one of the regional magnetic data sets were generated based on one or more of the following:
a plurality of magnetic measurements made within the first one of the geographical regions; or
a plurality of magnetic measurements made outside the first one of the geographical regions.

46. The apparatus of claim 21, wherein incorporating into the master geomagnetic map one or more of the regional magnetic data sets comprises creating one or more portions of the master geomagnetic map.

47. The apparatus of claim 21, wherein incorporating into the master geomagnetic map one or more of the regional magnetic data sets comprises updating one or more portions of the master geomagnetic map.

48. The apparatus of claim 47, wherein one or more of the portions of the master geomagnetic map comprise one or more portions of an Earth Magnetic Anomaly Grid with 2-arc-minute resolution (EMAG2) model.

49. The apparatus of claim 21, wherein each of one or more of the second magnetic-measurement devices is one of the first magnetic-measurement devices.

50. The apparatus of claim 21, wherein the mapping server is colocated at least in part with one or more of the regional servers and one or more of the first or second magnetic-measurement devices.

51. The apparatus of claim 23, wherein each of one or more of the first or second magnetic-measurement devices further comprises:
a global navigation satellite system (GNSS) receiver;
an inertial navigation system (INS); and
a wireless module.

52. The apparatus of claim 21, wherein the first one of the regional magnetic data sets were generated based on one or more of the following:
a plurality of magnetic measurements made within the first one of the geographical regions; or
a plurality of magnetic measurements made outside the first one of the geographical regions.

* * * * *